(12) United States Patent
Bruner et al.

(10) Patent No.: US 9,591,514 B2
(45) Date of Patent: Mar. 7, 2017

(54) OPTIMIZATION OF OVER-THE-TOP (OTT) SERVICES ON CARRIER NETWORKS

(71) Applicant: Microsoft Technology Licensing, LLC, Redmond, WA (US)

(72) Inventors: John D. Bruner, Bellevue, WA (US); Rod G. Fleck, Bellevue, WA (US); Jeffrey B. Kay, Bellevue, WA (US); Gursharan Singh Sidhu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 603 days.

(21) Appl. No.: 13/963,779

(22) Filed: Aug. 9, 2013

(65) Prior Publication Data

US 2014/0313902 A1 Oct. 23, 2014

Related U.S. Application Data

(60) Provisional application No. 61/813,806, filed on Apr. 19, 2013.

(51) Int. Cl.
*H04W 28/02* (2009.01)
*H04L 29/06* (2006.01)

(52) U.S. Cl.
CPC ..... *H04W 28/0236* (2013.01); *H04L 65/1069* (2013.01); *H04L 65/80* (2013.01); *H04W 28/0289* (2013.01)

(58) Field of Classification Search
CPC .......... H04W 28/0236; H04W 28/0289; H04L 65/80; H04L 65/1069
See application file for complete search history.

(56) References Cited

U.S. PATENT DOCUMENTS 7,706,291 B2    4/2010    Luft et al.
8,670,405 B1 *    3/2014    Lee ....................... H04W 36/24
                                                  370/331

(Continued)

OTHER PUBLICATIONS

Achour, et al., "Inter-Domain Mobility Management Solution for Service Continuity in IMS-Based Networks", In IEEE Consumer Communications and Networking Conference, Jan. 14, 2012, pp. 559-564.*

(Continued)

*Primary Examiner* — Redentor Pasia
(74) *Attorney, Agent, or Firm* — Brandon Roper; Judy Yee; Micky Minhas

(57) ABSTRACT

Methods and apparatus for executing a client-based, over-the-top (OTT) application, the client-based OTT application for maintaining communications with a second communication device, comprising, in one embodiment, a first transceiver for transmitting and receiving user traffic, a memory for storing processor-executable instructions, and a processor, coupled to the transceiver and the memory, for executing the processor-executable instructions that cause the wireless communication device to establish a first control plane connection, establish a second control plane connection, establish a first data plane for transporting the user traffic, the first data plane connection relating to the first control plane connection, establish a second data plane connection for transporting the user traffic if at least one predetermined event has occurred, the second data plane connection related to the second control plane connection, and to transmit and receive the user traffic over the second data plane connection via the first transceiver.

15 Claims, 10 Drawing Sheets

(56) References Cited

U.S. PATENT DOCUMENTS

| | | | |
|---|---|---|---|
| 2006/0245413 A1 | 11/2006 | Skalecki et al. | |
| 2008/0032695 A1 | 2/2008 | Zhu et al. | |
| 2008/0102815 A1 | 5/2008 | Sengupta et al. | |
| 2010/0172323 A1 | 7/2010 | Rexhepi et al. | |
| 2012/0014273 A1 | 1/2012 | Notton et al. | |
| 2012/0120914 A1 | 5/2012 | Sedlacek et al. | |
| 2012/0140743 A1* | 6/2012 | Pelletier | H04W 72/0453 370/335 |
| 2012/0236868 A1 | 9/2012 | Yan | |
| 2012/0282942 A1* | 11/2012 | Uusitalo | H04W 16/14 455/452.2 |
| 2013/0007286 A1 | 1/2013 | Mehta et al. | |
| 2013/0064106 A1 | 3/2013 | Sylvain | |
| 2013/0100887 A1 | 4/2013 | Kim | |
| 2013/0196653 A1* | 8/2013 | Morrison | H04W 28/08 455/426.1 |

OTHER PUBLICATIONS

Achour et al., "Inter-Domain Mobility Management Solution for Service Continuity in IMS-based Networks", Jan. 14, 2012.*

"International Search Report & Written Opinion for PCT Patent Application No. PCT/US2014/034440", Mailed Date: Nov. 12, 2014, 14 Pages.

Bellavista, et al., "An IMS Vertical Handoff Solution to Dynamically Adapt Mobile Multimedia Services", In IEEE Symposium on Computers and Communications, Jul. 6, 2008, pp. 764-771.

"International Preliminary Report on Patantability Issued in PCT Application No. PCT/US2014/034440", Mailed Date: Jun. 19, 2015, 11 Pages.

"Second Written Opinion Issued in PCT Application No. PCT/US2014/034440", Mailed Date: Mar. 25, 2013, 10 Pages.

* cited by examiner

OPTIMIZATION OF OVER-THE-TOP (OTT) SERVICES ON CARRIER NETWORKS

CROSS-REFERENCE TO RELATED APPLICATION

This application claims the benefit of U.S. Provisional Application No. 61/813,806, filed Apr. 19, 2013, the content of which is incorporated by reference herein in its entirety.

BACKGROUND

I. Field of Use

The present application relates to the field of network communications. More specifically, the present application relates to optimizing Over-the-Top Services that operate over carrier networks.

II. Description of the Related Art

Today, a number of VoIP services exist for PCs and phones. In general, these services work very well for voice, video, and data sharing when both users are using fixed-line DSL/cable infrastructure (or indirect via WiFi) since IP addresses do not change, bandwidth is relatively abundant, radio issues do not exist, and latency is low.

Over-the-Top services refer to services that run over a network, but that are not offered by an operator of the network. It is often referred to as "over-the-top" because these services ride "on top" of the service already provided by the network operator and don't require any business or technology affiliations with the network operator. An example of an OTT service is the Skype® VOIP communication service, which allows users to place VOIP calls, often for free.

To date, most Over-the-Top (OTT) VoIP services have simply moved their stationary home/office solutions directly to mobile devices. However, the user experience can become very poor (call drops, high latency, poor audio quality) when traditional best effort WAN-based data connections become congested on cellular networks. This is caused by the constantly changing radio conditions of both WiFi and carrier infrastructure and competition from carrier grade services like carrier voice to best effort data solutions.

Over the last 30 years, the wireless industry has created sophisticated metro-area networks allowing a single voice call to be handed off from cell-tower to cell-tower, depending on certain conditions. Over time, a data overlay (GPRS/EDGE) was created to allow data (initially text message and today internet pages to movies) to travel on the same network, but typically with lower priority to voice traffic which has a higher quality of service network guarantee. Later standards increased data rates and modulation standards, but continued voice with priority and data as a best-effort model. Today, the industry supports three concurrent networks for GSM (2G—GSM/EDGE, 3G—UMTS/HSPA+, and 4G—LTE) and two for CDMA (CDMA 1xRTT to CDMA EV-DO Rev B). Carrier networks handover devices between these standards, even while in a single call. In addition to current cellular networks, new cellular standards are also evolving to allow interoperability for both data and voice with 802.11 (WiFi) networks. In this case, phones and other mobile devices can connect either to the standard Internet backbone for best effort data or to new servers located at a carrier's premises to support carrier services (like voice and text) over WiFi.

Over the Top (OTT) services have been developed that allow information such as voice, text, presence, video chat, file sharing, etc. to be provided to users who have PCs, mobile handsets, or game machines with internet connections (whether WiFi or cellular). Often without cost (WiFi based), services like Skype are available to authenticate oneself and find active users to connect to. Once active IP addresses have been exchanged between clients, users can often complete a session (like a voice call) with minimal involvement by the service (NAT transversal). To date, most OTT services have been used on stationary terminals leveraging DSL or cable backhaul services. Since these commonly provide a static or session IP, have significant backhaul bandwidth, and do not suffer radio issues, many OTT sessions occur with limited to no quality issues.

Moving this OTT capability to mobile clients has proven difficult as both WiFi and cellular services have inherently varying signal conditions, especially while mobile (from walking to moving in a train or car). In WiFi circumstances, bandwidth is often good (except with many users sharing an AP or when some users have significant bandwidth demand—i.e. video streaming or with limited backhaul bandwidth), but signal conditions can vary dramatically at the edge of the access point signal range. Thus, full loss of signal or significant packet drop-out can occur as one goes far (50 to 100 m) from the access point. Note that obstacles such as walls and floors in a home with a single WiFi AP can also cause rapid changes in signal quality when the user moves around.

The issue in a cellular network is a combination of radio losses and carrier network control of resources. For the first, good cellular network design will try to provide at least voice coverage everywhere except deep in buildings/underground or in low-population density areas. A complex system of carrier network coordinated hand-offs between multiple towers and small cells also provides seamless hand-off of users as they move between coverage radii of various towers. However, network resource control prioritizes carrier services like voice above best effort services (like traditional browser or streaming data). Thus, in situations near the cell edge, periods of high congestion, high traffic, or poor tower backhaul, the network manager can force a user's best effort services to be degraded or temporarily suspended.

In summary, trying to provide OTT services on best effort networks (especially services like voice OTT services where customers expect fairly reliable continuous voice streaming) can be challenging at best.

SUMMARY

The embodiments described herein relate to methods and apparatus for maintaining communications between a wireless communication device executing a client-based, over-the-top (OTT) service, and a second communication device. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a wireless communication device is described for maintaining communications with a second communication device, the wireless communication device executing a client-based, over-the-top (OTT) communications application, comprising a first transceiver for transmitting and receiving user traffic, a memory for storing processor-executable instructions, and a processor coupled to the transceiver and the memory for executing the processor-executable instructions that cause the wireless communication device to establish a first control plane connection, establish a second control plane connection, establish a first data plane for transporting the user traffic, the first data plane connection relating to the first control plane connection, establish a second data plane connection for transporting the user traffic if at least one predetermined event has occurred, the second data plane connection related to the second control plane connection, and to transmit and receive the user traffic over the second data plane connection via the first transceiver.

In another embodiment, a server is described for maintaining communications between a wireless communication device and a second communication device, each of the devices running a client-based, over-the-top (OTT) communications application, the server comprising a network interface for sending and receiving user traffic between the wireless communication device and the communication device, a memory for storing processor-executable instructions, and a processor, coupled to the network interface and the memory, for executing the processor-executable instructions that cause the server to receive a request from the wireless communication device, via the network interface, to establish a first control plane connection with the server, establish the first control plane connection with the wireless communication device, receive a request from the wireless communication device, via the network interface, to establish a second control plane connection with the server after the first control plane connection has been established, establish the second control plane connection with the wireless communication device, establish a first data plane connection with the wireless communication device, the first data plane connection relating to the first control plane connection and for transporting user traffic, and begin sending and receiving the user traffic via a second data plane upon a determination, by the wireless communication device, that at least one predetermined event has occurred, the second data plane connection related to the second control plane connection.

In yet another embodiment, another wireless communication device is described for establishing and maintaining communications with a second communication device via a client-based, over-the-top (OTT) application running on both the wireless communication device and the second communication device, comprising a first transceiver for transmitting and receiving user traffic, the user traffic comprising time-dependent information, a memory for storing processor-executable instructions, and a processor, coupled to the transceiver and the memory, for executing the processor-executable instructions that cause the wireless communication device to establish a first control plane connection with the second communication device, establish a second control plane connection with the second communication device, maintain both the first and second control planes simultaneously, establish a first data plane with the second communication device for transporting user traffic, the first data plane established as a result of establishing the first control plane connection, transmit and receive the user traffic via the first data plane connection, determine to transmit and receive the user traffic over a second data plane connection, as a result of determining to transmit and receive the user traffic over the second data plane connection, establish the second data plane connection if at least one predetermined event has occurred, the second data plane connection established as a result of establishing the second control plane connection, and transmit and receive the user traffic over the second data plane connection.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
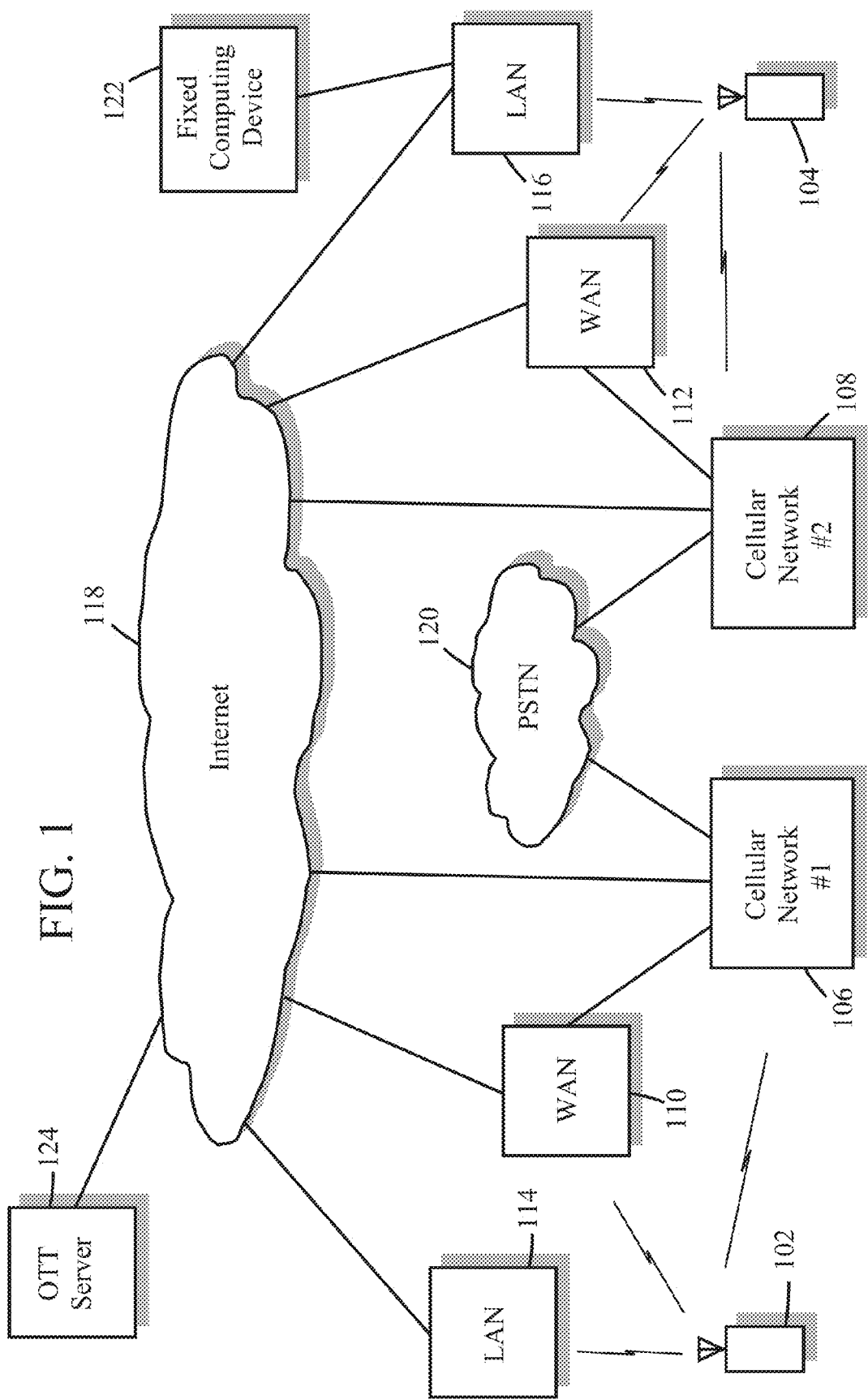
FIG. 1 illustrates one embodiment of a communication system used for over-the-top communications.

FIG. 1 illustrates one embodiment of a communication system used for over-the-top communications which make use of the concepts described herein. OTT services refer to "Over-the-Top" services, which make use of existing communication networks (e.g. packet-based Wide-Area-Networks (WANs) 110 and 112, Local Area Networks (LANs) 114 and 116, as well as connecting networks such as the Internet 118 and public switched telephone network (PSTN) 120, to transmit and receive information, and generally comprise software or one or more applications (collectively "app") running on a computing device such as a personal computer, laptop, tablet, wearable computing device, or mobile phone. OTT services may be further characterized in that they deliver time-dependent information such as audio and/or video information with network operators responsible only for transporting IP packets. For example, the well-known Skype® VoIP service, offered by Microsoft Corporation, of Redmond, Washington, is implemented in part by an "app" or application that may be downloaded to a tablet, laptop, smartphone or desktop computer and allows users to send and receive voice and video information to each other in real-time over a LAN 114 or packet-switched WAN 110, but, heretofore, typically not over a circuit-switched cellular network 106. Other examples of OTT services include Google Voice and Netflix.

When the Skype VoIP application is in operation, VoIP data packets, representing voice and video information, are interchanged between two computing communication devices (e.g., wireless communication devices 102 and 104, and fixed communication device 122) over one or more of the available communication networks.

Wireless Communication Devices ("WCD") 102 and 104 each comprises a wireless device, such as a smartphone, cellular and/or network-enabled tablet or computer, video and audio devices capable of transmitting video and audio signals (e.g., "user traffic") and capable of communicating over one or more available communication networks, or circuitry installed into automobiles, aircraft, and other transportation vehicles that allow passengers or operators to send and receive wireless communications. Fixed communication device 122 comprises a "desktop" computer, POTS telephone, or any other communication device that relies on a physical connection, such as a data cable, to send and receive information over a data network such as Internet 118 via LAN hardware, typically comprising a wired or wireless router (shown in FIG. 1 as wireless router 116, which typically includes wired capabilities).

When a user of WCD 102 wishes to communicate with a second communication device over existing networks, such as WCD 104 or fixed communication device 122, an OTT application on WCD 102 may be initiated by the user. The user provides contact information related to a person he or she wishes to contact to the OTT application, either by selecting the person from a list of contacts previously entered into WCD 102 or by manually entering the information. In any case, the OTT application uses the contact information to initiate a call by establishing a first control plane connection, and then sending traffic over a data plane associated with the first control plane. WCD 102 further establishes a second control plane connection, via a different communication channel, that allows the call to be switched quickly to a second data plane associated with the second control plane. The first and second communication channels may utilize the same physical communication network but use different bands, frequencies, qualities of service, subscriber identities (for example, SIM cards), and/or data or network protocols, or they may use different networks. The first and second communication channels may also utilize different physical communication networks.

In one embodiment, a SIM card could store information related to two or more subscriber accounts. For example, one SIM card could store three IMSI (international mobile subscriber identity) numbers, each one representing an account that a user may have with one or more carriers. In this embodiment, when a user of WCD 102 initiates a communication using an OTT application being executed on WCD 102, a first control plane connection may be established using a first of the three IMSIs and a second control plane connection additionally established using a second of the three IMSIs. For example, the first control plane could be established over circuit-switched cellular network 106 and the second control plane established over circuit-switched cellular network 108. Or, both the first control plane and second control plane could be established over circuit-switched cellular network 106. In any case, after establishment of at least the first control plane connection, user traffic may then be transmitted and/or received over a first data plane connection associated with the first control plane connection. Subsequently, the user traffic may later be switched to a second data plane connection associated with the second control plane connection if the quality of the communication degrades past a predetermined point, and/or one or more other criteria are met.

In another embodiment, each communication device involved in a communication may establish their own control and data planes with a common communication point, such as OTT server 124 or a functional component within WAN 110 or cellular network 106 (such as a well-known mobile switching center (MSC), LTE signaling node, packet data network gateway, and others, for example). In a related embodiment, at least one control plane connection could be established by such a common communication point with one or both end devices, e.g., WCD 102, WCD 104, communication device 122. In other words, rather than establish two or more control/data planes end-to-end between two end devices, this embodiment allows each communication device, or a common communication point, to establish one or more control/data planes therebetween which allow the end devices to communicate with each other. Then, as conditions change for one or both of the communication devices, either one may choose to communicate through a different data plane without affecting the control and/or data planes of the other communication device.

For example, WCD 102 may establish first and second control plane connections/data plane connections with OTT server 124 during setup of a communication to, for example, fixed communication device 122. OTT server 124 may then establish a control plane connection with fixed communication device 122 and alert fixed communication device 122 of an incoming communication from WCD 102. Fixed communication device 122 may accept the invitation from OTT server 124 and begin transmitting and receiving user traffic with OTT server 124 over a data plane connection associated with the control plane connection established by OTT server 124. During the communication, WCD 102 may decide to transmit and receive user traffic over a second data channel to OTT server 124. This may occur without any changes to the control/data plane connection between OTT server 124 and communication device 122.

In another related embodiment, where WCD 102 communicates with WCD 104, one or more control/data planes may be established by WCD 104 after receiving a notification from WCD 102 (or the common communication point) of an incoming communication. WCD 104 may establish first and second control plane connections with OTT server 124 (rather than directly with WCD 102) as a result of receiving the notification, and begin transmitting and receiving user traffic over a data plane connection associated with one of the control plane connections established with the common communication point.

Each of WCD 102 and 104 may comprise circuitry and firmware that allows them to communicate through 1) a local area network (LAN) 114 (e.g. wireless router femtocell (not shown) or other local cellular base station, or other local area network hardware), 2) a packet-switched wide area network (WAN) 110 or 112, such as an HSPA+or LTE data overlay network, e.g., a data network with virtual or logical links to an underlying network, such as cellular network 106, 3) a circuit-switched cellular network 106 or 108 (such as a CDMA-based or GSM-based cellular networks providing first, second and third generation voice and data services to cellular telephones such as networks developed under the well-known IS-95 and GSM standards), and/or any other communication network, such as a satellite communication network (e.g., Globalstar or Iridium), White Space network, etc. In the case of data networks such as WAN 110 and 112, data packets may be administered on a "best effort" basis, which does not guarantee packet delivery in a timely manner, or on one or more levels of a guaranteed Quality of Service (QOS), which prioritizes certain data for delivery before other data that is classified as lower priority data. An example of data that may be classified as high priority is any time-sensitive data, such as voice or video information, while lower priority packets may comprise, for example, text messages or web pages. The differentiating factor from one QOS level and another is typically the amount of latency that may be tolerated before communications become degraded to an unacceptable level.

In one embodiment, during initiation of a communication from WCD 102 to, for example, WCD 104, the OTT service running on WCD 102 causes WCD 102 to establish two or more control plane connections with either WCD 104 or a central communication point that are simultaneously active. In another embodiment, WCD 102 maintains two or more active control plane connections as a matter of normal operation, independent of the OTT service. The term "control plane connection" may refer to network resources allocated by a network to enable user traffic flow across one or more communication networks and the associated signaling that occurs during a communication to support traffic flow over a data plane.

After a first control plane connection has been established, user traffic (e.g., voice and/or video) may be transmitted and received between WCD 102 and WCD 104 over a "data plane connection" associated with the first control plane connection. The term "data plane connection" may refer to the transport of user traffic such as voice or video information, over a communication channel. Thus, during initial setup of a communication between WCD 102 and WCD 104, a first control plane connection is established that causes network infrastructure associated with LAN 114, WAN 110, or cellular network 106, to assign network resources to allow communication between WCD 102 and WCD 104 to occur over a first data plane associated with the first control plane.

As an example, the OTT service running on WCD 102 may request a control plane connection using WAN 110 by transmitting a request to a radio access network (RAN) associated with cellular network 106 (in the case that WAN 110 is an overlay network of cellular network 106). In response, the RAN assigns network resources (such as an IP address associated with WCD 102 and may also assign or retrieve an IP address associated with WCD 104) to allow communications between WCD 102 and WCD 104 to occur. Once the control plane has been established, a data plane may be opened very quickly (e.g., user traffic may begin flowing) between WCD 102 and WCD 104.

WCD 102 also establishes at least a second control plane connection in addition to the first control plane connection. This process may occur simultaneously, or near-simultaneously, with the establishment of the first control plane, or it may occur at some point after establishment of the first control plane. The second control plane connection is another set of resources, different than the resources used for the first control plane connection, that allow WCD 102 to communicate with WCD 104 via a second data plane. The second control plane is established to enable a quick transition to the second data plane if communications over the first data plane deteriorate, or if a switch is desired for other reasons, such as cost. WCD 102 may actively search for additional communication channels during communications with WCD 104, as well as periods where communications are not occurring.

To further the example above, the OTT service running on WCD 102 may request a control plane connection using LAN 114 by first authenticating with OTT server 124, which may comprise sending one or more encryption elements to OTT server 124, (e.g., an encrypted session key, a private/public RSA key, AES key, etc), and in addition sending identification information of WCD 102 (e.g., an IP address assigned by LAN 114). In response, OTT server 124 authenticates WCD 102, and may advertise WCD 102's presence to other users of the OTT service, may determine the type of NAT and firewall that WCD 102 is behind, and may discover nodes (other users) that have one or more public IP addresses associated with them. OTT server 124 may then provide WCD 104's credentials to WCD 102 in response to the control connection request, for example, a public key belonging to WCD 104, signed by OTT server 124 and/or an IP address related to WCD 104. WCD 102 receives this information from OTT server 124 and may authenticate WCD 104 and also agree on a session key with WCD 104.

At any time, either during communications with WCD 104 or when disengaged with communications, WCD 102 may actively search for other communication channels to either add, or supplement, any existing control planes already in place. If such an additional communication channel is found, WCD 102 may establish a third control plane with the additional communication channel to supplement the first and second control planes, or the third control plane could replace one of the two control planes not in current use.

As WCD 102 sends and receives user traffic to/from WCD 104 using the first data plane, it may be desirable, at some point, to switch communications from the first data plane to a second data plane due to one or more factors, such as the quality of the communication over the first data plane, the cost of using the first data plane, the quality of the second data plane, the cost of using the second data plane, the location of WCD 102, a past history of the location of WCD 102, the time of day, the availability of a preferred network. For example, in one embodiment, a call may be switched from a first data plane to a second data plane if the call quality, as measured by a packet error rate, packet loss, signal strength, transmitted power level (in CDMA systems), voice loss detection, packet latency, and/or other metric, falls below a minimum quality standard, indicating poor voice quality. In another embodiment, a call may be switched from a first data plane to a second data plane if it is determined that a benefit would be available by switching to the second data plane, such as lower cost, higher call quality, or other factor. Cost considerations may include the cost of using a data plane to the user, the cost of using the data plane by an OTT service provider, and related criteria, such as the time of day. In short, one or more metrics may be monitored to determine whether to switch a communication in progress from one data plane to a second data plane corresponding to a pre-established second control plane.

If WCD 102 determines that the communication quality, or some other metric or combination of metrics, has crossed one or more predetermined thresholds (e.g., has met, exceeded, fallen below, etc), WCD 102 begins transmitting and receiving user traffic on the second data plane, i.e., over LAN 114. The switch between the first data plane and the second data plane happens fast enough so as to impose a minimal amount of disturbance to the users engaged in the communication. For example, in a VoIP call, the switch occurs within a time period that avoids the perception of dropped speech, or otherwise reduces the quality of the voice call. In a video transmission, the switch occurs within a time period that minimizes the amount of video data that is lost.

The determination of when to switch data planes may be based on a hierarchy of preferred communication channels, networks, or other preference(s) that may be stored in a memory inside WCD 102. The hierarchy may be based on the actual or stated data rate of a communication channel, the cost to send information over the communication channel, the known availability of the communication channel (based, for example, on past experiences), or other criteria. For example, a typical hierarchy of preferred communication channels may include:

1. LAN (QoS)—Packets are transmitted from a wireless communication device through a local router, femtocell, or other hardware near the wireless communication device, then provided to Internet 118. Packet routing occurs on a prioritized basis with respect to other types of data. For example, priority may be requested using the well-known Resource Reservation Protocol (RSVP) to request and reserve resources through a network. In another embodiment, packets are marked according to the type of service desired. In response to these markings, routers and switches use various queueing strategies to tailor performance to expectations.

2. LAN (Best Effort)—Packets are transmitted from a wireless communication device through a local router, femtocell, or other hardware near the wireless communication device, then provided to Internet 118 and, ultimately, to an end device. However, the packets are delivered, as the name suggests, on a "best effort" basis.

3. WAN (QoS)—First preferred service provider—Packets are transmitted to a wide-area network, such as WAN 110, and routed through Internet 118 on a priority basis. WAN 100, in this case, is provided by a service provider that is most preferred by a user of a wireless communication device. For example, "most preferred" may be the user's main wireless service provider, a service provider with the least expensive rates as compared to other service providers, a service provider with the best call quality, a service provider with the fastest data rates, and/or a combination of these factors.

4. WAN (QoS)—Second preferred service provider—Packets are transmitted to a wide-area network, such as WAN 112, and routed through Internet 118 on a priority basis. WAN 112, in this case, is provided by a service provider that may comprise any other service provider than a "preferred" service provider, or it may be the second best service provider with respect to contractual arrangement (e.g., use second preferred network if first preferred network is not available), cost, quality, data rate, and/or a combination of these factors.

5. WAN (Best Effort)—Packets are transmitted to a wide-area network, such as WAN 110 and routed through Internet 118 on a "best effort" basis.

6. Cellular data—Data is transmitted to a cellular network, such as cellular network 106, in accordance with well-known 2G and 3G technologies such as 1×RTT, EVDO, and EDGE, where it is converted into IP-based packets and sent over Internet 118.

7. Cellular Circuit-Switched Voice—Data from the OTT application is converted into packets suitable for transmission using cellular voice channels, such as the channels used by second and third generation CDMA and GSM communication systems (e.g., IS-95, GSM, WCDMA, CDMA2000, etc). An end-to-end connection is established by the cellular network throughout the duration of the communication.

The cost to use any of the above-listed communication channels may vary depending on the time of day. Thus, the cost structure of each of communication channel may be stored in memory as well (i.e., cost vs. time of day) and used to make determinations to use one available communication channel over another. For example, during a communication between WCD 102 and WCD 104, if it becomes less costly to send data packets using a WAN, QoS, from the first service provider than to send data packets using another WAN, QoS, provided by the second service provider, then the data plane used to send data packets associated with the second service provider may be switched to a data plane associated with the first service provider, if a control plane relating to the first service provider was previously established by WCD 102.

As shown above, WCD 102 may be provisioned to use more than one service provider. For example, WCD 102 could be configured to operate over a network operated by AT&T, of Dallas Texas and a network operated by Verizon Wireless, of Irvine, Calif. The cost to provide services over any network may vary as a function of time of day, location, data rate, or other criteria. In the case of multiple service providers, WCD 102 may indicate a preferred service provider in its memory, either alone or in combination with cost data that varies by time, location, data rate, etc. This information may be used by WCD 102 to set one or more policies, or rules, that determine when to use one data plane vs. another.

The determination of when to switch data planes may be, alternatively or in combination with the preferred communication channels described above, based on other criteria, such as whether WCD 102 is mobile or stationary and, if mobile, the speed at which WCD 102 is moving. Speeds under 7 miles per hour, for example, may indicate that the user of WCD 102 is not traveling in a motor vehicle and, thus, not likely to encounter communication channels other than what is already known by WCD 102. If the user's speed is determined to be consistent with travel in a vehicle, such as in a car, train, or airplane, this might alter the preferred communication channel to more emphasize a communication channel utilizing WAN 110, due to its general widespread availability.

The location of WCD 102 may also have an impact on the selection of a data plane. For example, WCD 102 may be configured to determine the location of WCD 102 during various times of each day, and then construct a history of the user's location vs. time. For example, if the user commutes 5 days per week, Monday through Friday, first by biking to a train station, taking a train to a train stop near the user's place of employment, and then taking a shuttle bus to the user's place of employment, WCD 102 could be configured, using GPS, triangulation, or some other technique well known to those skilled in the art, to determine the user's location as a function of time. WCD 102 may then use this location/time information to predict where the user may be traveling to next, and establish a control plane in accordance with a communication channel that may be available to the user in the near future.

WCD 102 may store one or more policies in memory to determine when or whether to switch a communication from one data plane to another. The policy(s) may combine any of the information, described above, to determine when to switch. For example, the information above describes the different criteria that may be used to individually determine when to switch communications, such as present data plane call quality, potential data plane call quality, preferred service providers, cost, time of day, speed, location, prior location data, and future location predictions based on prior location data or other data, such as calendar information. Almost any combination of these criteria can be used to implement one or more policies that determine when to switch between on data plane and another. Several example policies include:

1. Always establish at least two control plane connections associated with the lowest-cost data planes presently available and use a data plane associated with the lower cost control planes of the two established control planes 2. Always prefer to use LAN-based communication channels, if available 3. Always switch from circuit-switched communication channels to WAN-based communication channels or LAN-based communication channels 4. If user is on the way to work, and is going to travel greater than 10 miles per hour, always use a WAN-based communication channel if available; if not, use circuit-switched communication channel, but switch to WAN-based communication channel or LAN-based communication channel as soon as one is available.

5. Use QoS only when the quality of Best Effort routing results in poor quality communications, but switch back to Best Effort when it is determined that a call can achieve quality in excess of a predetermined threshold.

6. Always migrate towards a cheaper data plane

Another feature available when utilizing two or more control planes/data planes is to transmit and receive the same information over two data planes simultaneously. Such a simultaneous transmission/reception may be useful during transitions between one data plane and another, during poor communication quality on a communication channel, or sudden drop outs. In this embodiment, during any of the afore-mentioned scenarios, after at least two control plane connections have been established, two associated data planes are opened simultaneously, and the same data is transmitted on both data planes simultaneously, or nearly so, while data may be received over both data planes simultaneously, or nearly so. Regarding transmission by WCD 102, user traffic intended for reception by WCD 104 may be provided to two transmitters, one each for transmitting over a particular data plane, or to a single transmitter, where the data stream may be encoded and/or modulated differently for transmission over, for example, data planes having different frequencies, data rates, Quality of Service, etc. For example, in the former, user voice data from the user of WCD 102 could be provided to both a transmitter configured to transmit over a circuit-switched CDMA network and a transmitter configured to transmit over LAN 114. In an example of the latter, data packets may be formed from voice information, comprising a first IP address having a first Type of Service (TOS) field value and a second set of data packets may be formed, comprising the same voice information but with a different TOS field value. Both sets of IP data packets may then be transmitted using the same transmitter. In another embodiment, the same information may be packaged into two different sets of data packets, each set of data packets constructed in accordance with a particular data protocol, such TCP/IP, RDP, UDP, etc. This process will be described in greater detail later herein.

With regard to simultaneous or near-simultaneous data reception, data may be received over two or more receivers within WCD 102, or a single receiver. In the first case, each receiver is configured to communicate over a different communication channel. For example, a first receiver may be configured to communicate over LAN 114, while a second receiver may be configured to communicate over WAN 110. In this case, two data streams, representing the same information transmitted by communication device 104, are received and combined to form the best quality data stream to present to the user of WCD 102. This process will be described in greater detail later herein.

Figure 2:
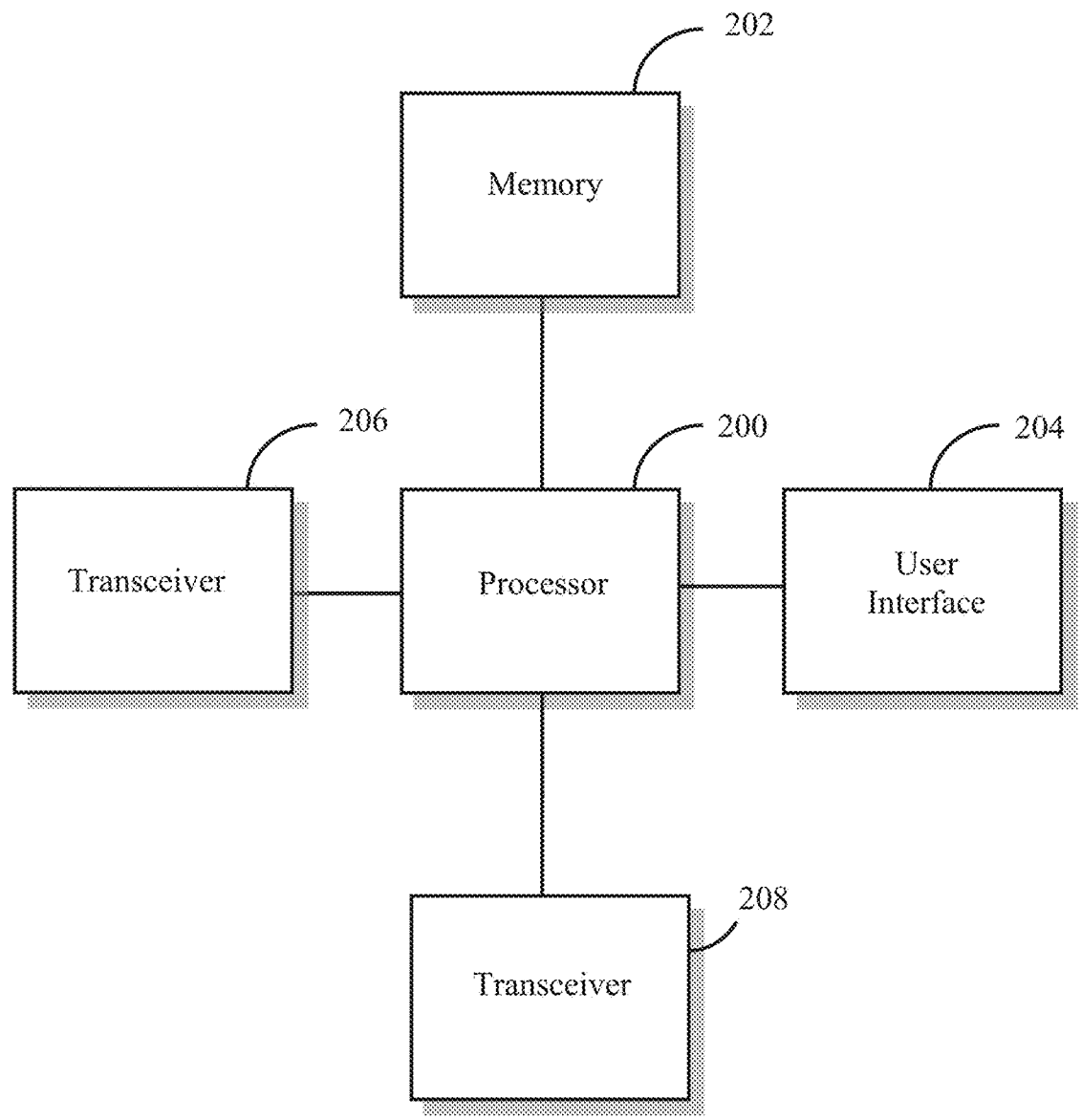
FIG. 2 illustrates a functional block diagram of one embodiment of a wireless communication device used in the system of FIG. 1.

FIG. 2 illustrates a functional block diagram of one embodiment of WCD 102 or one embodiment of WCD 104. Specifically, FIG. 2 shows processor 200, memory 202, user interface 204, a first transceiver 206 and an optional second transceiver 208. Each of transceiver 206 and transceiver 208 typically comprises a transmitter and a receiver. It should be understood that the functional blocks shown in FIG. 2 may be connected to one another in a variety of ways, and that certain, basic functionalities have been omitted (such as a power supply) for purposes of clarity.

Processor 200 comprises one or more processors that are configured to provide general operation of WCD 102 and to perform actions necessary to implement the teachings contained herein, by executing processor-executable instructions stored in memory 202. Processor 200 is typically a processor designed for mobile telephony applications, such as the Snapdragon S4 dual-core processor manufactured by Qualcomm Incorporated of San Diego, Calif.

Memory 202 comprises one or more information storage devices that can be accessed by processor 200 and may include one or both of volatile and nonvolatile media, and/or removable and/or non-removable media, but excludes propagated signals. By way of example, and not limitation, such as volatile and/or nonvolatile, removable and/or non-removable media implemented in any method or technology for storage of information such as computer-readable instructions, data structures, program modules or other data. Memory 202 includes, is not limited to RAM, ROM, EEPROM, flash memory, or other type of memory technology used in smartphone designs, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 200. In typical applications, memory 202 comprises more than one memory type, for example, it is common to find both RAM memory as well as Flash memory in today's smartphones.

Memory 202 is used to store the processor-executable instructions for general operation of WCD 102 or WCD 104, as well as the specific instructions necessary to perform operations associated with multiple, simultaneous control/data plane connections. Memory 202 is further used to store applications, or "apps", that may either be pre-loaded into WCD 102 during the manufacturing process, or downloaded by a user of WCD 102. Memory 202 may further be used to store one or more policies, or rules, for determining when to switch a call from one data plane to another. Finally, memory may store one or more parameters that are determined by processor 200, such as packet loss during a communication, packet error rate during a communication, location and associated time information of previous communications, a preferred list of service providers, cost structures associated with one or more service providers, packet latency during a communication, a signal strength of RF energy received during a communication, a transmitted power level (in CDMA systems), a voice loss detection indicator, and threshold levels associated with any of the foregoing, which may indicate that a different data plane is preferred over a data plane currently in use.

User interface 204 is typically coupled to processor 200 and allows an individual to operate and interact with WCD 102 or WCD 104. For example, user interface 204 may comprise one or more pushbuttons, switches, sensors, touch-screens, keypads, keyboards, ports, and/or microphones that generate electronic signals for use by processor 200 upon initiation by a user. User interface 204 may additionally comprise one or more visual displays, such as a liquid crystal display (LCD), organic light-emitting diode (OLED), or any other type of visual display for visual display of information to users. User interface 204 may alternatively, or in addition, comprise one or more audio generation devices, such as a speaker or loudspeaker, as well as a tactile alert mechanism, such as a vibration-generation device that is used to provide non-auditory signals to a user. Of course, the aforementioned items could be used alone or in combination with each other and other devices may be alternatively, or additionally, used.

Transceiver 206 comprises circuitry necessary for transmitting and receiving information using a first communication protocol, such as any variety of CDMA, GSM, 802.11 (Wi-Fi), Wi-FI Direct, and/or LTE. Transceiver 206 may comprise a single integrated circuit, such as the MB86L10A multi-mode transceiver, manufactured by Fujitsu, of Tokyo, Japan. Another example of transceiver 206 is WTR1605 radio frequency IC transceiver, manufactured by Qualcomm Incorporated. Transceiver 206 may further comprise a multi-mode modem suited for the particular transceiver, such as an MDM9615, also manufactured by Qualcomm Incorporated, which receives intermediate frequency signals from the integrated circuit transceiver, demodulates them, and provides them to processor 200. Similarly, data from processor 200, representative of voice, video, or other information, is provided to the modem for modulation in accordance with a particular type of communication protocol, then provided to the integrated transceiver for wireless transmission to network infrastructure, such as a base transceiver station or a local wireless router associated with LAN 106.

Transceiver 208 is an optional, second transceiver within WCD 102 or WCD 104 that comprises circuitry necessary for transmitting and receiving information using a second communication protocol, different from the protocol used by transceiver 206. For example, if transceiver 206 is based on CDMA technology, transceiver 208 might be based on GSM technology. In another example, transceiver 208 is based on Wi-fi technology, such as the BCM4335, manufactured by Broadcom Corporation of Irvine, Calif. Transceiver 206 may comprise a single integrated circuit, such as the RTR8615L multi-mode transceiver, manufactured by Qualcomm Incorporated. Transceiver 206 may further comprise a multi-mode modem suited for the particular transceiver, such as an MDM9200, also manufactured by Qualcomm Incorporated, which receives intermediate frequency signals from the integrated circuit transceiver, demodulates them, and provides them to processor 200. Similarly, data from processor 200, representative of voice, video, or other information, is provided to the modem for modulation in accordance with a particular type of communication protocol, then provided to the integrated transceiver for wireless transmission to network infrastructure, such as cellular network 106 or a local wireless router associated with LAN 114.

Figure 3:
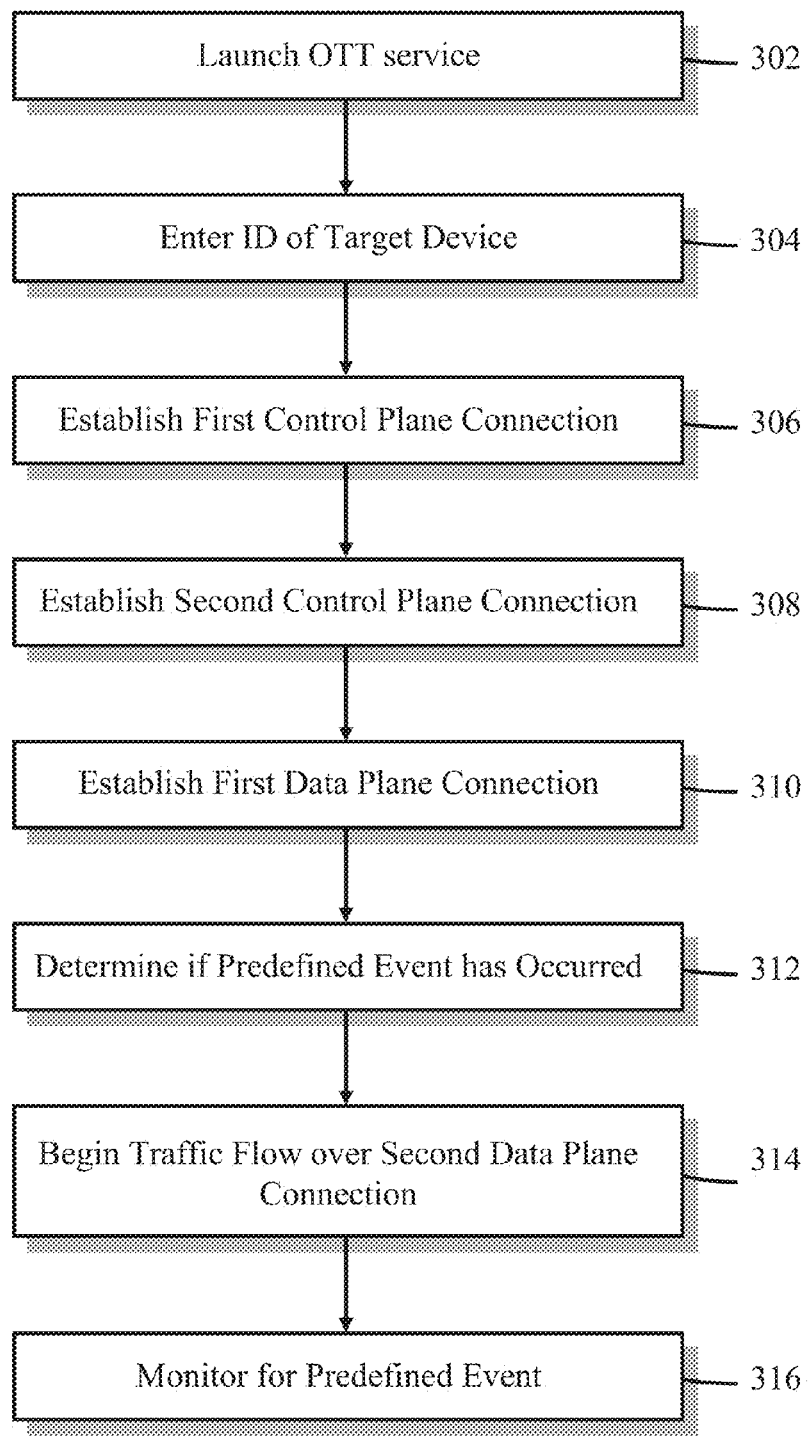
FIG. 3 is a flow diagram illustrating one embodiment of a method for maintaining communications between a wireless communication device using a client-based OTT application executed on the wireless communication device, and another communication device.

FIG. 3 is a flow diagram illustrating one embodiment of a method 300 for maintaining communications between a wireless communication device (e.g. WCD 102) using a client-based OTT application executed on the wireless communication device, and another communication device (e.g., fixed communication device 122). The method is implemented by a processor inside WCD 102, such as processor 200 shown in FIG. 2, executing processor-executable instructions stored in a memory, such as memory 202 shown in FIG. 2. It should be understood that the processor-executable instructions used to implement the method may be entirely associated with the OTT application, with operation of WCD 102, or shared between the two. It should further be understood that in some embodiments, not all of the steps shown in FIG. 3 are performed, and/or the order in which the steps are carried out may be different. Finally, some minor method steps have been omitted for purposes of clarity.

At block 302, a user of WCD 102 launches a client-based OTT application resident on WCD 102, via user interface 204. In another embodiment, the OTT application is executed by default upon, for example, power-up of WCD 102.

At block 304, the user enters identifying information regarding a party that the user would like to contact via the OTT application (in this example, the party is a user of fixed communication device 122). The information may comprise a telephone number, an email address, or other information that uniquely identifies the party. The identifying information may have been previously entered and stored by the application, so that the user may simply select a party from, for example, an "address book," or "call history" stored by the application. Further still, the user may select the party via a "buddy list", "friends list", or similar, i.e., a list of contacts that the user has previously identified and stored in either the OTT application, at OTT server 124, or both.

At block 306, WCD 102, in response to the user selecting a party, WCD 102 establishes a first control plane connection with the fixed communication device 122 over LAN 114, WAN 110, or cellular network 106 at particular frequency, data rate, band, QoS, or specified manner, i.e., "circuit switched voice" or "cellular data". In one embodiment, WCD 102 is provided an IP address associated with fixed communication device 122 via OTT server 124 or another network-based device. In other embodiments, alternatively or in addition to providing the IP address of fixed communication device 122, various network resources may be allocated in order to complete a call from WCD 102 to fixed communication device 122. In one embodiment, establishment of the first control plane connection occurs after the user has selected a party to connect to or otherwise entered identifying information relating to the party.

In other embodiments, WCD 102 establishes and maintains control plane connections independently of the OTT application so that WCD 102 establishes control plane connections as they become available, and in accordance with predefined policies stored in memory 202, as will be explained later herein. In these embodiments, the processor-executable instructions relating to establishment of control plane connections by WCD 102 may not be associated with any particular OTT application. However, any client-based OTT application may use the control plane connections and data plane connections established by these instructions during execution of an OTT application.

As indicated previously, the establishment of a control plane connection may comprise a request for network resources necessary in order to transmit and receive traffic over a data plane associated with the control plane connection. In other words, the establishment of a control plane connection enables WCD 102 to transmit/receive user traffic (e.g., voice or video) using the resources allocated by a network. In some embodiments, a control plane connection request comprises a particular preference of how the network should route data through the network. For example, when establishing a first control plane connection with WAN 110, WCD 102 may request that WAN 110 allocate resources in order to route data on a quality of service (QoS) basis, meaning that data transmitted by WCD 102 would be routed on a higher priority basis than that of other network traffic, for example, traffic designated as "best effort". The control plane connection request may be sent to a radio access network (RAN) or other network allocation equipment associated with cellular network 106.

When a request to establish a first control plane is received by network infrastructure associated with WAN 110 or cellular network 106, the network infrastructure may assign network resources to accommodate the control plane connection request. Different types of networks may allocate resources differently in order to meet the control plane establishment request. For example, in a CDMA cellular network where WCD 102 has requested a control plane connection using circuit-switched communications, the cellular network 106 may determine one or more base stations in range of a target wireless communication device based on a previous registration of the wireless communication device with the cellular network. Assignment of network resources, then, will typically comprise assigning a base station to the communication, and then the selected base station may assign a traffic channel to the wireless communication device. The assignment of a traffic channel may involve assigning a modem at the base station to transmit and receive information to/from the wireless communication device. The modem assigned to the communication by the base station may further negotiate with the wireless communication device to determine parameters associated with the potential communication from WCD 102, such as whether the communication will be a voice or a data communication and, if a voice communication, a rate at which information will be encoded/decoded by vocoders located at both the base station and the wireless communication device. The allocation of network resources in a CDMA, circuit-switched communication is well-known in the art.

In a GSM-based network, such as 3G UMTS, the assignment of network resources in response to a control plane connection request for a circuit-switched communication is handled in a similar method to the process described above, and is also well-known in the art.

WCD 102 may alternatively send a control plane connection request for a packet data communication using WAN 110, where the request is in conformance with the particular type of network selected (e.g., LTE, HSPA+). In response, the network may assign resources, such an IP address to WCD 102 and another IP address to a target device. In another embodiment, the IP address of the target device is maintained by OTT server 124 and provided to WCD 102 upon receipt of a message from WCD 102 indicating a desire to communicate with a user associated with a target device. The assignment of resources is in conformance with the network type that provides packet data communications, such as a GPRS/EDGE, UMTS, LTE, CDMA 1×RTT, CDMA EV-DO, or CDMA EV-DV network. Such assignment of resources is well known in the art.

WCD 102 may alternatively send a control plane connection request for a packet data communication over LAN 114. The request may comprise a message sent to a local wireless router as a request to join LAN 114 and, in response, the wireless router assigns an IP address to WCD 102. In another embodiment, WCD 102 has joined LAN 114 previously, and currently holds an IP address assigned by the local wireless router. In any case, WCD 102 sends a message to OTT server 124 requesting address information of a particular user of the OTT service. In response, OTT server 124 may search an internal database for a network address, email address, or telephone number belonging to the user, as would have been received in a previous registration by the user of fixed communication device 122. The previous registration may include an IP address assigned by LAN 116 or WAN 112, telephone number, or some other unique identifier for contacting the user.

After the first control plane connection has been established with fixed communication device 122, a signal may be sent to the fixed communication device 122 via the first control plane connection to alert fixed communication device 122 that WCD 102 wishes to establish communications with it. The OTT application may alert the user of WCD 102 that a connection to fixed communication device 122 is being established. However, as this process is being carried out, or at any other time, WCD 102 may establish one or more other control plane connections to support traffic between WCD 102 and fixed communication device 122, as explained below.

At block 308, WCD 102 establishes a second control plane connection with fixed communication device 122. This may occur at any point after the establishment of the first control plane connection, or it may occur simultaneously or contemporaneously with the establishment of the first control plane connection. The second control plane connection may utilize a different network than the first control plane connection, or both control plane connections could use the same network, but different frequencies, bands, data rates, protocols, etc. For example, a first control plane connection may comprise resources needed to establish a packet data connection WAN 110 using a Best Effort mode, while the second control plane connection comprises resources needed to establish a packet data connection over WAN 110 using QoS.

In any case, WCD 102 establishes a second control plane connection with fixed communication device 122 using the same or similar techniques discussed above with respect to establishing the first control plane connection. WCD 102 may establish more than two control plane connections in some embodiments, limited to the availability of networks, processing resources available within WCD 102, etc.

At block 310, at some point after establishment of the first control plane connection, a first data plane is established between WCD 102 and fixed communication device 122, the first data plane associated with the first control plane connection. Establishment of the first data plane connection may occur before or after establishment of the second data plane connection. Establishing a data plane comprises sending user traffic, such as voice and/or video, between the devices. In the case where multiple control plane connections exist before the establishment of first data plane, a control plane connection is chosen based on one or more policies stored in memory 202 and may depend on factors such as potential/estimated call quality, cost, general network availability, data type, data rate, time of day, and/or other factors, as will be explained later herein.

At some point during the communication between WCD 102 and fixed communication device 122, it may become desirable to switch the communication to a data plane associated with the second control plane connection. This may be desirable as a result of the deteriorating communication quality experienced by WCD 102, WCD 104, or both, and/or as a result of other factors, such as the cost to route information through the first and/or second data planes, a time of day, the availability of a preferred network provider, etc. The decision of when to switch between data planes, and/or which data plane to use in an initial communication, may be determined by one or more policies, or rules, stored in memory 202. For example, one policy may always dictate that WCD 102 communicate through a LAN if one is available. In another example, another policy might list of set of service providers in order of most/least preferred, and then use a data plane associated with the most-preferred service provider in the list. In another example, a policy might use the communication quality between users as a basis for determining when to use another data plane. For example, if the communication quality on a particular data plane deteriorates past a predetermined threshold, as measured by one or more of packet latency, packet loss, error rate, packet latency, signal-to-noise ratio, the number or rate of dropped or damaged packets, the signal strength, the transmitted power level (in CDMA systems), and/or other factors that might influence the quality of communications between parties, the policy could dictate that communications be switched to a second data plane. Other policies may combine the various factors, such as a policy to have WCD 102 always use a preferred service provider except during the hours of 9 pm and 6 am, during which the communication quality shall be the sole determining factor for switching between/among data planes. A virtually unlimited number of combinations could be used to determine when to switch data planes, and an identification of which data plane to switch to.

Thus, at block 312, WCD 102 determines one or more characteristics of the communication occurring between WCD 102 and fixed communication device 122 and/or whether other factors, described above, are present. If one or more of the characteristics cross one or more predetermined thresholds, WCD 102 may terminate communications over the first data plane and begin communications using a second data plane associated with the second control plane that was previously established. The switch to the second data plane may comprise a break-before-make transition or a make-before-break transition. The pre-existence of the second control plane enables the traffic between WCD 102 and fixed communication device 122 to occur quickly, with no or minimal perceived loss of call quality to either device.

In other embodiments, WCD 102, alternatively or in addition, monitors one or more characteristics of the second data plane while WCD 102 is sending and receiving traffic over the first data plane. In this embodiment, information regarding the quality of the second data plane can be used, alternatively or in addition, to the information regarding the quality of the communications currently occurring over the first data plane to determine when or whether to switch traffic to the second data plane. The characteristics of the second data plane used to make a switch/use determination may be the same or different than the characteristics used to make a switch determination from the first data plane. WCD 102 may determine characteristics of the second data plane by momentarily establishing a second data plane connection while communications occur over the first data plane, from WCD 102 to fixed communication device 122, or from WCD 102 to an intermediary point between WCD 102 and fixed communication device 122, such as WAN 110. For example, WCD 102 could momentarily establish the second data plane connection and send a "ping" to fixed communication device 122 and/or WAN 110 and receive a reply indicating the time it took for the reply to be received by WCD 102, indicating, for example, packet latency, packet error loss, etc. Thus, the characteristics of the second data plane and/or control plane may be monitored in conjunction with the characteristics of the data plane currently in use. The characteristic(s) may then be compared to one or more thresholds or criteria stored in memory 202 relating to call quality to determine whether or not the quality of the second data plane has crossed the threshold. If so, processor 200 may decide, based on one or more policies stored in memory 202, to switch transmission and reception of user traffic to the second data plane connection. This embodiment may be particularly useful in situations where a preferred service provider is identified in the one or more policies (e.g., switch to a preferred network provider only if the quality of the data plane connection associated with the preferred network provider exceeds the quality threshold stored in memory).

At block 314, if at least one of the characteristics identified in one of the policies stored in memory 202 are met, WCD 102 may terminate user traffic flow over the first data plane and begin user traffic flow over the second data plane by sending signaling information to WCD 104 via well-known signaling protocols such as SIP/SDP or SS7. The signaling information informs WCD 104 that WCD 102 is changing the data plane connection, and to begin transmitting user traffic over the new data plane connection. In another embodiment, WCD 102 continues to receive traffic flow over the first data plane connection as it transitions to the second data plane connection. In one embodiment, communications may be transmitted and/or received over both data planes as the switch occurs. Thus, for a brief period of time (e.g., less than a second), communications between WCD 102 and fixed communication device 122 may occur over both data planes.

At block 316, after switching to the second data plane, WCD 102 continues to monitor characteristics of one or both data planes and/or control planes, as well as other characteristics, in order to determine whether a predefined event has occurred (such as a preferred network provider becoming available, one or more quality characteristics associated with the user traffic/data plane becoming degraded past a predetermined point, cost of using one data plane vs. another, etc.) which initiates a switch either back to the first data plane, or to establish a third control plane connection for use in subsequent communications.

Figure 4:
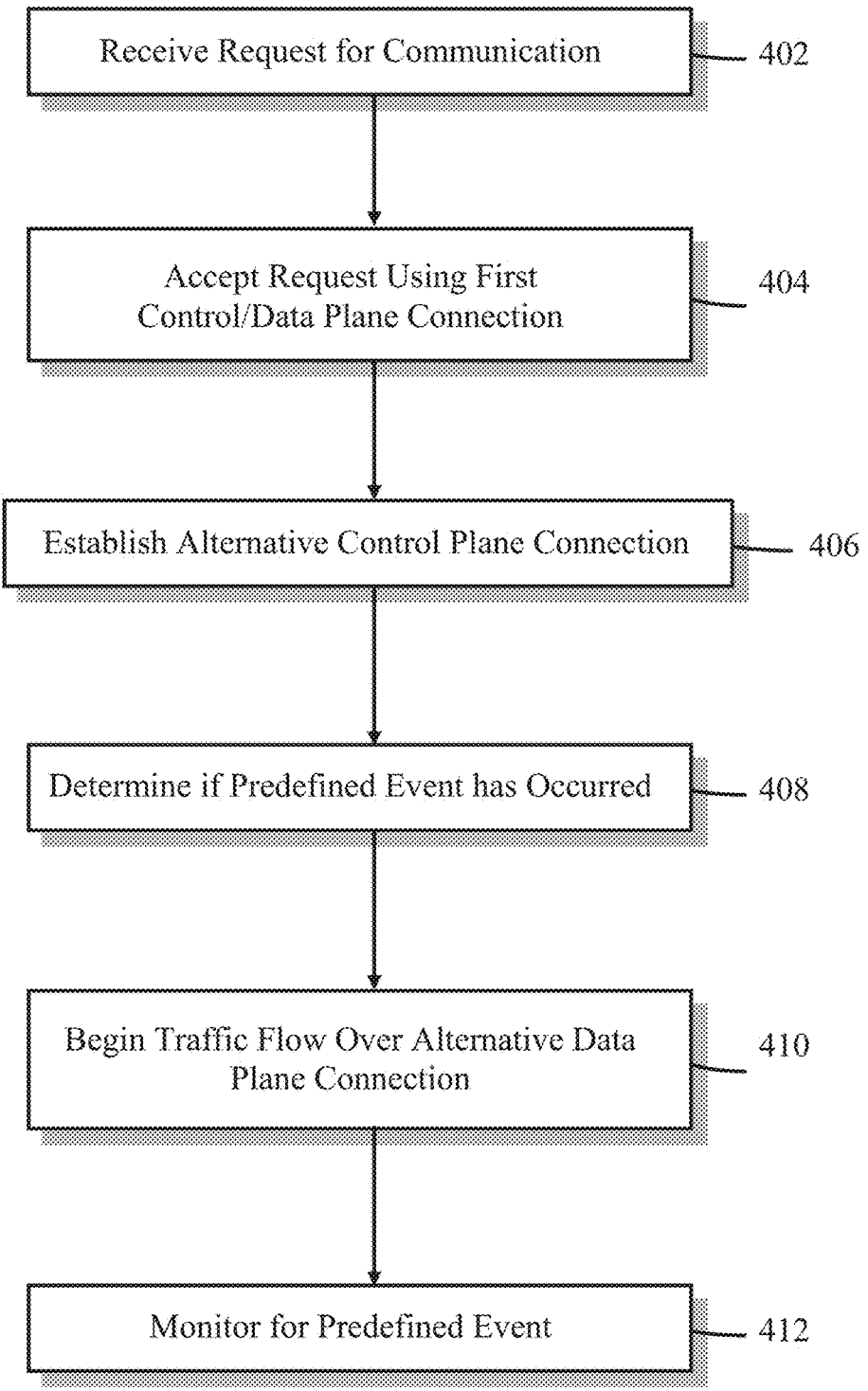
FIG. 4 is a flow diagram illustrating one embodiment of a method for maintaining call quality for a wireless communication device using a client-based OTT service when the wireless communication device is a called party (e.g., mobile terminated call)

FIG. 4 is a flow diagram illustrating one embodiment of a method 400 for maintaining call quality for a called party (i.e., WCD 104) in communication with caller (i.e., WCD 102) (e.g., a "mobile terminated" call), wherein at least WCD 104 uses a client-based OTT service. The method is implemented by a processor inside WCD 104, such as processor 200 shown in FIG. 2, executing processor-executable instructions stored in a memory, such as memory 202 shown in FIG. 2 (for this embodiment, it is assumed that WCD 104 comprises the same or similar components to what is contained within WCD 102 and, therefore, reference will be made to FIG. 2 to describe components within WCD 104). It should be understood that in some embodiments, not all of the steps shown in FIG. 4 are performed, and/or the order in which the steps are carried out may be different. It should be further understood that some minor method steps have been omitted for purposes of clarity.

At block 402, a WCD 104 receives a request to accept a communication with

WCD 102, over a first control plane selected by WCD 102. For example, WCD 102 could initiate contact with WCD 104 using a client-based VoIP application running on WCD 102 via LAN 114, internet 118, and LAN 116. On WCD 104, user interface 204 alerts a user of WCD 104 that a call is incoming, using techniques well known in the art.

At block 404, WCD 104 accepts the incoming call and begins transmitting and receiving user traffic over a data plane associated with the first control plane.

In some embodiments, at block 406, WCD 104, after accepting the incoming call at block 404, establishes an alternative control plane connection in accordance with one or more policies stored in memory 202, if a control plane different than the one associated with the incoming call is available. For example, if the control plane associated with the incoming call comprises a QoS packet data communication over WAN 112, WCD 104 could establish a control plane connection associated with a "best effort" packet communication via LAN 116. Establishment of this second control plane is the same, or substantially similar to, the techniques discussed above and known to those skilled in the art.

In another, related embodiment, WCD 104 may establish two or more control plane connections prior to WCD 104 receiving the incoming call from WCD 102, as part of standard operating procedures of WCD 104. In this embodiment, WCD 104 searches for available networks/control planes/data planes available to it and establishes two or more control planes in accordance with the one or more policies stored in memory 202. Then, when a user traffic is exchanged over a data plane associated with one of the two, pre-established control planes, WCD 104 will be able to switch to a second data plane associated with the second control plane if required or desired by the one or more policies stored in memory 202.

At some point during the communication between WCD 102 and WCD 104, it may become desirable for WCD 104 to switch the communication to a data plane associated with the second control plane connection established by WCD 104. This may be desirable as a result of one or more predetermined events occurring, such as the communication quality perceived by WCD 104 deteriorating past a predetermined threshold indicating poor voice/video quality, and/or as a result of other factors, such as the cost to route information through the first data plane, a time of day, the availability of a preferred network provider, etc. The decision of whether and when to switch to a second data plane, and/or which data plane to use in an initial communication, may reside in one or more policies stored in memory 202 as one or more sets of rules. Such policies are described above in relation to the policies stored by WCD 102. WCD 104 may use the same, or different, policies as WCD 102.

Thus, at block 408, WCD 104 may determine if one or more predetermined events have occurred, such as the communication occurring between WCD 102 and/or WCD 104 and/or one or more of the other factors occurring. If one or more of the characteristics exceed one or more predetermined thresholds indicating poor voice/video quality, and/or other factors, WCD 104 may terminate communications over the current data plane and begin communications using a second data plane associated with the control plane that was established by WCD 104, either as a result of accepting the incoming call at block 404, or as a result of establishing two or more control plane connections during standard operation of WCD 104, as described in the related embodiment of block 406, above. The pre-existence of the second control plane enables WCD 104 to rapidly switch data planes in order to avoid, or even anticipate, poor communication quality and/or to minimize the cost of communications with WCD 102.

In another embodiment, WCD 104, alternatively or in addition, monitors one or more characteristics of the second control and/or data plane while WCD 104 is communicating over the first data plane, similar to the process described above in relation to WCD 102 being able to monitor quality characteristics associated with a second data plane. Thus, the characteristics of the second data plane may be monitored in conjunction with the characteristics of the data plane currently in use, to determine when to switch communications between data planes and/or which data plane to use during initial communications.

At block 410, if at least one of the characteristics identified in one of the policies stored in memory 202 are met, WCD 104 terminates communications over the first data plane and begins communications over the second data plane. In one embodiment, communications may be transmitted and/or received over both data planes as the switch occurs. Thus, for a brief period of time (e.g., less than a second), communications between WCD 102 and WCD 104 may occur over both data planes.

At block 412, after switching to the second data plane, WCD 104 continues to monitor characteristics of one or both data planes, as well as secondary characteristics, in order to determine whether a predefined event has occurred (such as a preferred network provider becoming available, one or more quality characteristics associated with the user traffic/data plane becoming degraded past a predetermined point, cost of using one data plane vs. another, etc.) which initiates a switch either back to the first data plane, or to establish a third control plane connection for use in subsequent communications.

Figure 5:
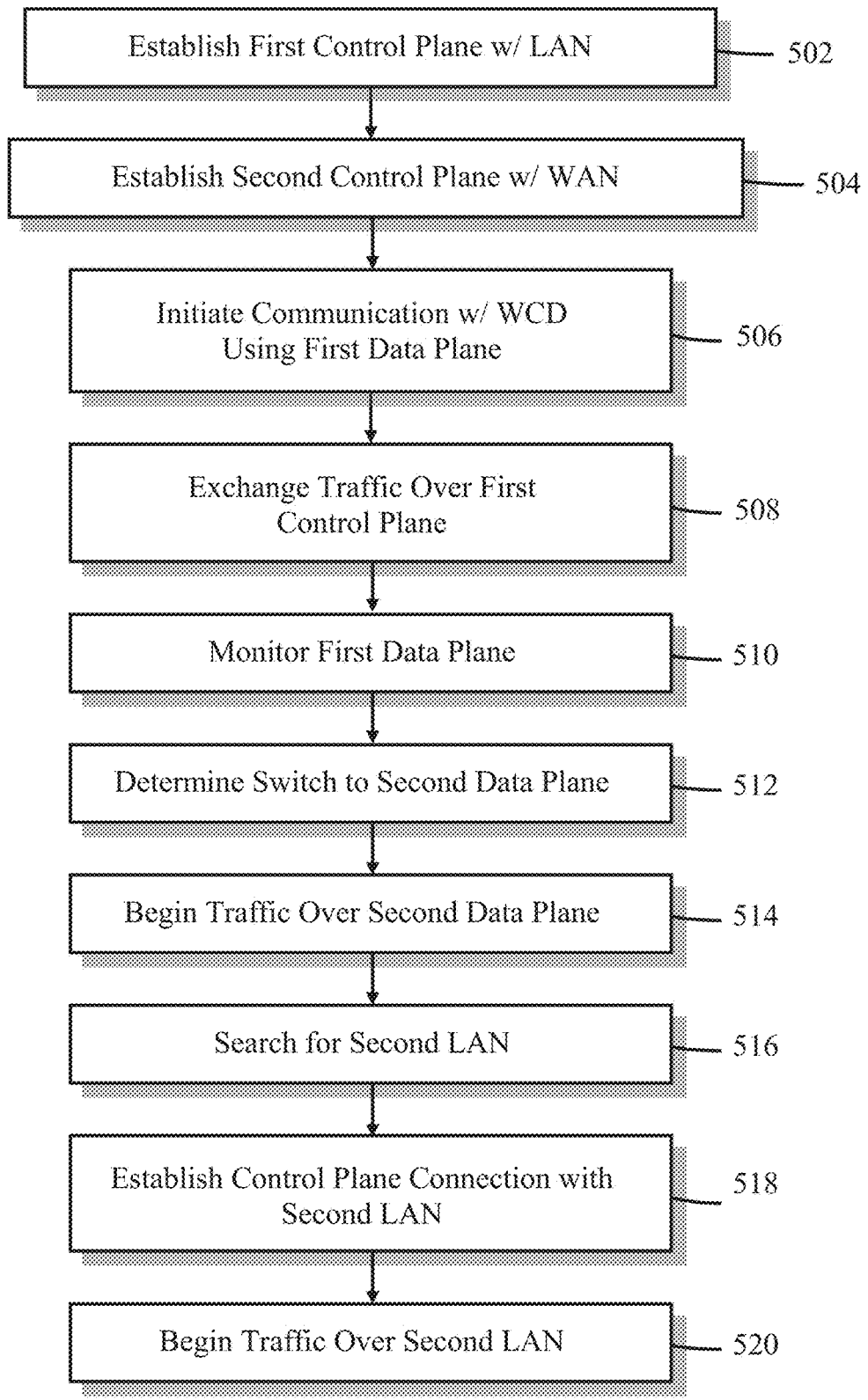
FIG. 5 is a flow diagram illustrating one embodiment of a method for establishing a temporary data plane connection to act as an "anchor" while trying to establish an alternative data plane connection, in a client-based OTT communication session.

FIG. 5 is a flow diagram illustrating one embodiment of a method 500 for establishing a temporary data plane to act as an "anchor" while trying to establish an alternative data plane, in a client-based OTT communication. This method is especially useful in situations where WCD 102 is roaming between two or more local area networks (e.g., WiFi networks). The method is implemented by a processor within WCD 102, such as processor 200 shown in FIG. 2, executing processor-executable instructions stored in a memory, such as memory 202 shown in FIG. 2. It should be understood that in some embodiments, not all of the steps shown in FIG. 5 are performed, and/or the order in which the steps are carried out may be different. It should be further understood that some minor method steps have been omitted for purposes of clarity.

At block 502, WCD 102 establishes a first control plane connection over LAN 114. As part of that process, WCD 102 determines a SSID, frequency, and/or band (e.g., 2.4 GHz/5 GHz).associated with an access point (e.g., a wireless router) in range of WCD 102 and requests to join the access point. In turn, the access point may assign WCD 102 an IP address.

At block 504, WCD 102 establishes a second control plane connection, typically using resources associated with a communication path more geographically diverse than a LAN, i.e., a network connection that is available over a large geographical area, such as WAN 110 in this example.

At block 506, WCD 102 initiates communications with WCD 104 using the first control plane connection, i.e., using signaling techniques well known in the art.

At block 508, WCD 102 and WCD 104 begin exchanging user traffic over the first data plane associated with the first control plane.

At block 510, WCD 102 monitors characteristics of the first data plane, including the quality of the communication and/or secondary characteristics such as cost, time of day, etc. WCD 102 may, additionally or alternatively, monitor quality characteristics associated with the second control plane and/or data plane.

At block 512, WCD 102 determines, based on one or more policies stored in memory 202, to switch to a second data plane associated with the second control plane, i.e., to begin transmitting and receiving over WAN 110. In this example, one policy may prescribe switching to another data plane from LAN-based communications to WAN-based communications if it is determined that the signal strength from a wireless router associated with a LAN falls below a predetermined threshold, and a WAN is available having a signal strength greater than a predetermined threshold. In another example, a policy may prescribe switching to another data plane if WCD 102 determines that the transmission power level of transceiver 206 crosses a predetermined threshold, indicating that WCD 102 is nearing the limit of its availability to communicate with a cellularbase station due to noise from other wireless communication devices, network congestion, distance from a cellular base station, etc. In yet another example, a policy may prescribe switching to another data plane if WCD 102 determines, based on previous time and location data of WCD 102 stored in memory 202, that the first data plane will soon be lost due to, for example, WCD 102 entering a portion of a building incapable of receiving wireless signals from LAN 114. For example, a user of WCD 102 may have a meeting every day, at a particular time, in a location that does not have access to LAN 114. If this information is stored in memory 202, WCD 102 may determine that the current time is just before the start time of the daily meeting, and that the user will likely soon lose communications with LAN 114.

Thus, at block 514, before the communication over the first data plane is lost, WCD 102 begins communications over the second data plane associated with the second control plane, i.e., WAN 110, even though this may be a more expensive way to communicate. However, it may be desirable to at least temporarily connect to WAN 110 in order to preserve the communication.

At block 516, after switching to the second data plane, WCD 102 attempts to find another LAN by determining an SSID in range of WCD 102. In one embodiment, a second access point (e.g., second wireless router) is discovered.

At block 518, WCD 102 establishes a third control plane connection with the second access point by sending a request to join and authenticate with the second access point. The second access point may assign WCD 102 an IP address as a result of receiving the request to join the network.

At block 520, after establishing the third control plane with the second access point, WCD 102 may begin transmitting and receiving information over the third data plane associated with the third control plane, i.e., using the second access point, in accordance with the one or more policies stored in memory 202. Thus, in this example, WAN 110 serves as a temporary communication network as WCD 102 moves from one LAN to another.

Figure 6:
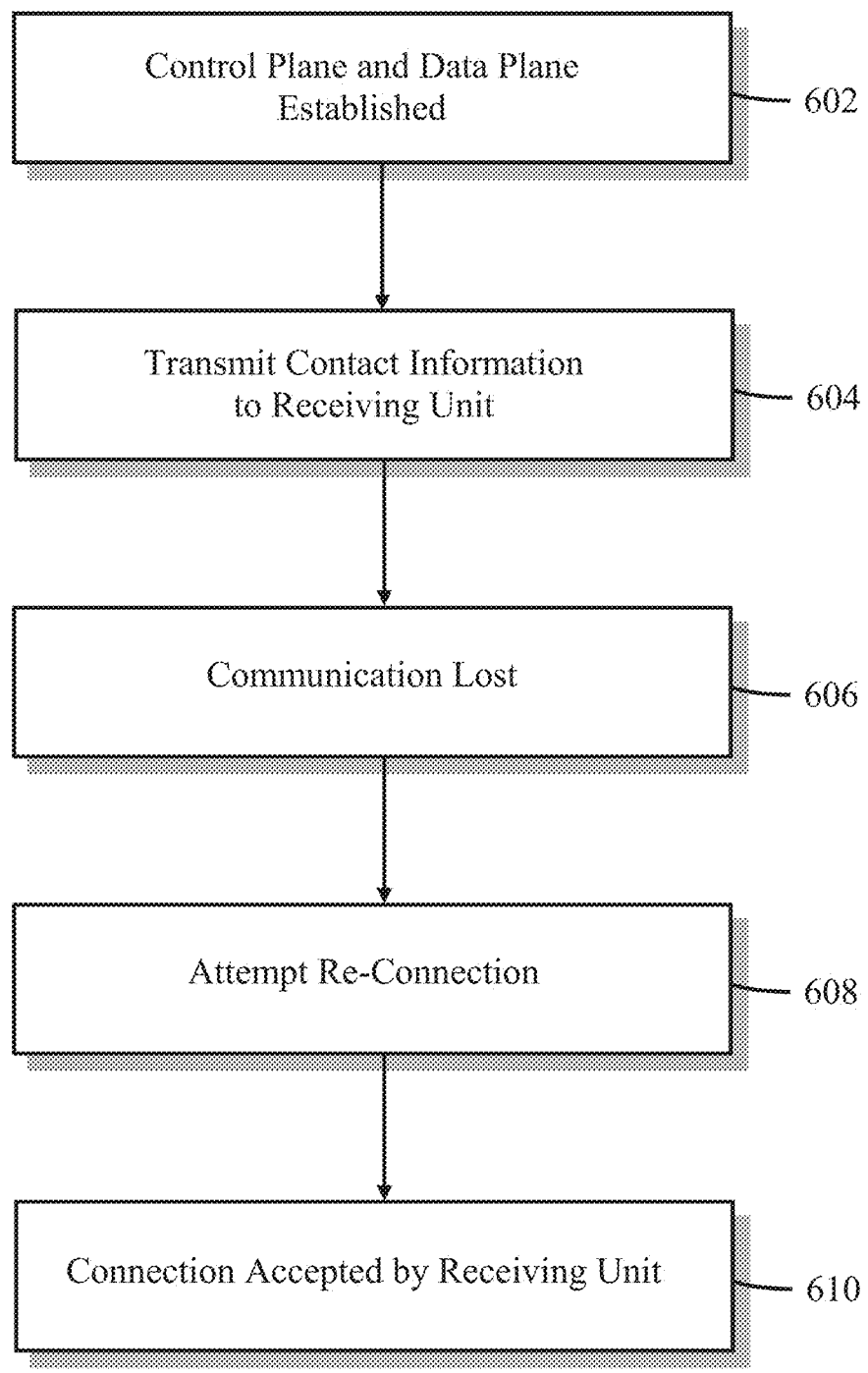
FIG. 6 is a flow diagram illustrating one embodiment of a method for re-establishing a communication between a first wireless communication device and a second wireless communication device, both using a client-based, OTT service, after the communication has been unintentionally disconnected, or "dropped"

FIG. 6 is a flow diagram illustrating one embodiment of a method 600 for re-establishing a communication between WCD 102 and WCD 104 after the communication has been unintentionally disconnected, or "dropped". The method is implemented by a processor within WCD 102, such as processor 200 shown in FIG. 2, executing processor-executable instructions stored in a memory, such as memory 202 shown in FIG. 2. It should be understood that in some embodiments, not all of the steps shown in FIG. 6 are performed, and/or the order in which the steps are carried out may be different. It should be further understood that some minor method steps have been omitted for purposes of clarity.

At block 602, WCD 102 has already established a control plane and associated data plane connection with WCD 104. Additionally, each of WCD 102 and WCD 104 has established at least one alternative control plane connection, using the techniques discussed above.

In one embodiment, at block 604, WCD 102 transmits contact information to WCD 104, informing WCD 104 of the control/data planes presently available to WCD 102. WCD 104 may also inform WCD 102 of its presently-available control/data plane connections. For example, WCD 102 may inform WCD 104 that it presently has a first IP address assigned by LAN 114 and a second IP address assigned by WAN 110. In another embodiment, information regarding the control planes and/or data planes of both devices may be provided to the other device via OTT server 124.

At block 606, the communication between WCD 102 and target device is lost, due to a "dropped call". This could be the result of signal degradation associated with either WCD 102 or WCD 104, too many data packets being "dropped", delays in receiving data packets, too much data flow in a given network, or other reasons.

At block 608, WCD 104 attempts to re-establish communications with WCD 102 by establishing a control plane connection with WCD 102 using control plane information received by WCD 104 at block 604. In one embodiment, the selected control plane comprises the control plane that was last used to communicate with WCD 102. In another embodiment, WCD 104 re-evaluates the data planes available to it just prior to attempting to re-establish communications, and then uses whichever control/data plane to use based on the one or more policies stored in its memory. In yet another embodiment, the selected control plane comprises the control plane that was not being used just prior to the disconnection, in hopes of avoiding any communication problems associated with the original control plane connection and/or data plane connection.

For example, WCD 102 may have been communicating over a data plane via LAN 114 just prior to the disconnection and have been assigned an IP address of 192.168.0.2, and also may have been assigned an IP address of 156.204.33.95 via a second control plane connection, i.e., via WAN 110. This information could have been communicated to WCD 104 prior to the disconnection. Upon disconnect, WCD 104 may try to re-establish communications using one of these control planes, and attempt to reach WCD 102 via the LAN IP address, i.e., 192.168.0.2. Alternatively, target device 102 might try to reach WCD 102 via the alternative IP address assigned by WAN 110, on the belief that there may be a problem with LAN 114 as a reason for the disconnect. In another embodiment, WCD 104 may first try to establish a control plane connection with WCD 102 using the last known-good control plane connection and, failing that, attempt to establish a control plane connection using the alternative control plane connection provided to WCD 104 at block 604.

Similarly, WCD 102 may also try re-establishing communications with WCD 104 in the same way as described above.

If both WCD 102 and WCD 104 attempt re-connection, each device may receive an indication that the other is attempting to re-establish communications while each device is presently attempting to contact the other device. For example, as WCD 104 is calling WCD 102 via the IP address associated with LAN 110, WCD 102 may be trying to call WCD 104 via an IP address assigned by WAN 112. In this case, each device may receive an alert indicating that the other device is busy in a call.

To avoid this, at block 610, upon receiving an indication from WCD 102 that WCD 102 is attempting communications with WCD 104 over the original control plane connection, WCD 104 accepts the call from WCD 102 and cancels its attempt at establishing the other control plane with WCD 102. Upon acceptance of the call from WCD 102, communications between WCD 102 and WCD 104 continue over the original data plane.

Figure 7:
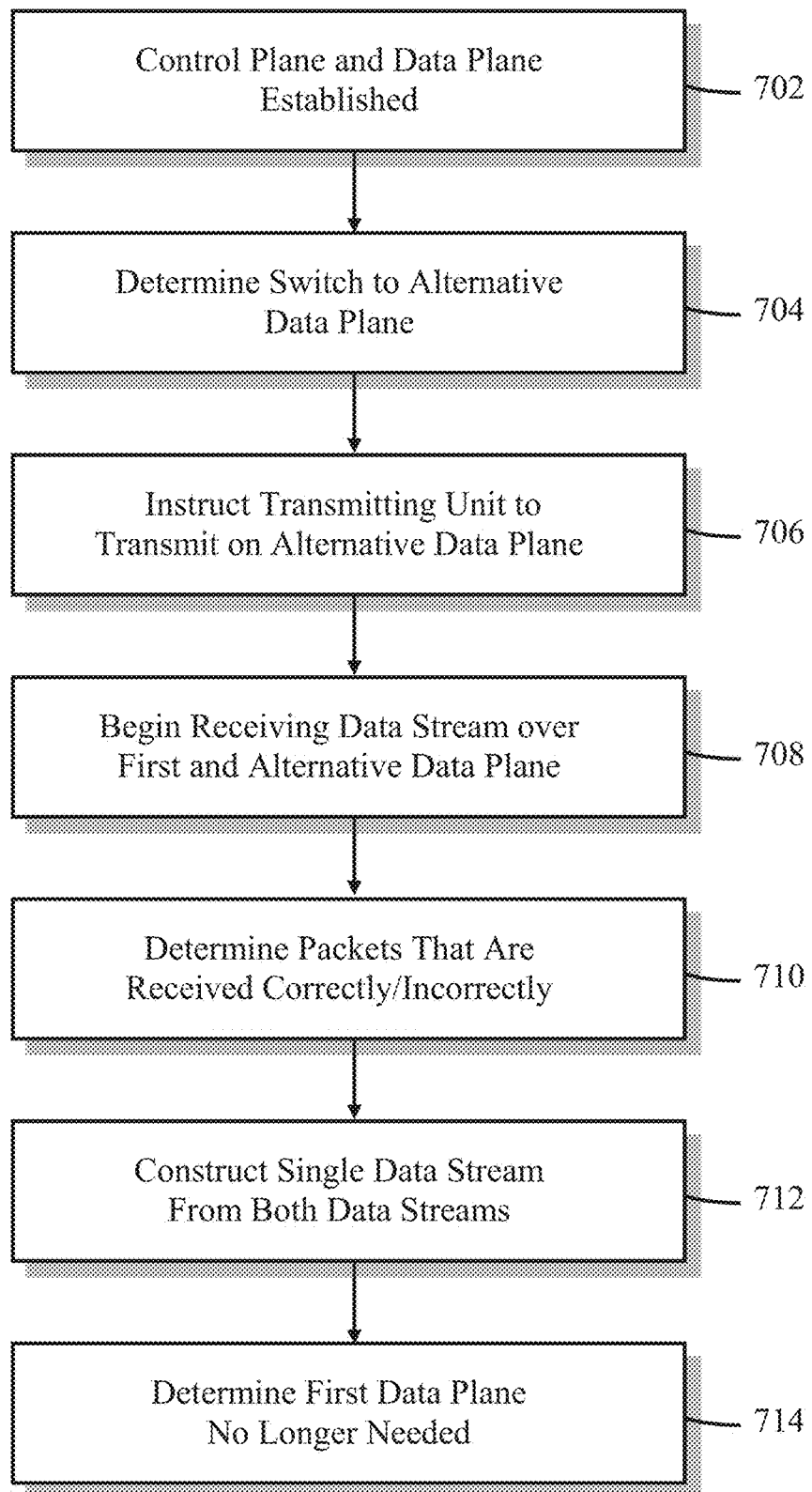
FIG. 7. is a flow diagram illustrating one embodiment of a method for merging received data streams during a transition from one data plane to another during use of a client-based OTT service.

FIG. 7 is a flow diagram illustrating one embodiment of a method 700 for merging received data streams during a transition from one data plane to another during use of a client-based OTT service. The method could also be used during periods where the call quality between users on one data plane degrades past a predetermined threshold. The method is implemented by a processor within WCD 102, such as processor 200 shown in FIG. 2, executing processor-executable instructions stored in a memory, such as memory 202 shown in FIG. 2. It should be understood that in some embodiments, not all of the steps shown in FIG. 7 are performed, and/or the order in which the steps are carried out may be different. It should be further understood that some minor method steps have been omitted for purposes of clarity.

At block 702, WCD 102 has already established a control plane connection and data plane connection with WCD 104. Additionally, each of WCD 102 and WCD 104 has established at least one alternative control plane connection, using the techniques discussed above.

At block 704, WCD 102 determines, based on one or more policies stored in memory 202, that WCD 102 should continue the communication on an alternative data plane associated with the alternative control plane connection previously established by WCD 102.

At block 706, WCD 102 instructs WCD 104, over the first control plane, to begin providing user data over the second data plane. In one embodiment, this is done by WCD 102 sending one or more signaling messages to WCD 104 over the first control plane connection.

At block 708, WCD 102 begins receiving the same user traffic transmitted by WCD 104 over both the first and second data planes. This may involve, for example, receiving a first packet data stream over transceiver 206 and a second packet data stream over transceiver 208. For example, transceiver 206 could comprise a WiFi transceiver able to communicate over LAN 114, while transceiver 208 could comprise a radio (e.g. CDMA) transceiver able to communicate over WAN 110. In this case, WCD 102 may receive two streams of packet data, one from each transceiver, after demodulation. In another embodiment, one stream of data packets is received via one of the transceivers, while audio packets might be received via the other transceiver (e.g., vocoder frames). In this case, the data packets are converted into an audio signal and combined with an audio signal resulting from decoding the audio packets. Each data stream may comprise different quality characteristics. For example, the data stream received over LAN 114 might have a packet loss rate of only 2% while the data stream over WAN 110 might have a packet loss rate of 10%.

At block 710, processor 200 determines which data packets from each stream are received correctly. Conversely, processor 200 may determine which data packets have been received in error, or not received at all, for each data stream. In one embodiment, the determination is performed on IP data packets, although in other embodiments, the determination could be performed at a higher hierarchical level (in the OSI network stack), such as at an OTT application layer. In this example, one audio stream produced from, for example, IP data packets, could be supplemented with an audio stream produced from, for example, vocoder frames.

At block 712, processor 200 constructs a single data stream using data packets from both data streams. The single data stream is then further processed and provided to the user of WCD 102. For example, processor 200 may construct the data stream by evaluating each packet in one of the data streams and, if a data packet is missing or is corrupt, determining whether the particular data packet was successfully received over the other data plane. If so, processor 200 places the packet from the other data stream into the single data stream being constructed by processor 200. Processor 200 is able to identify missing/lost/corrupt packets using techniques well known in the art.

At block 714, in one embodiment, processor 200 determines that the quality of the data being received over one of the data planes is sufficient to halt the process of merging two data streams. This may be accomplished by comparing one or both received data streams to one or more predetermined thresholds, such as the packet error rate, latency, etc. In one embodiment, if the packet error rate drops below a predetermined threshold for more than a predetermined amount of time, processor 200 stops using data packets from the other data plane and stops using the other data stream to enhance data stream reconstruction.

Figure 8:
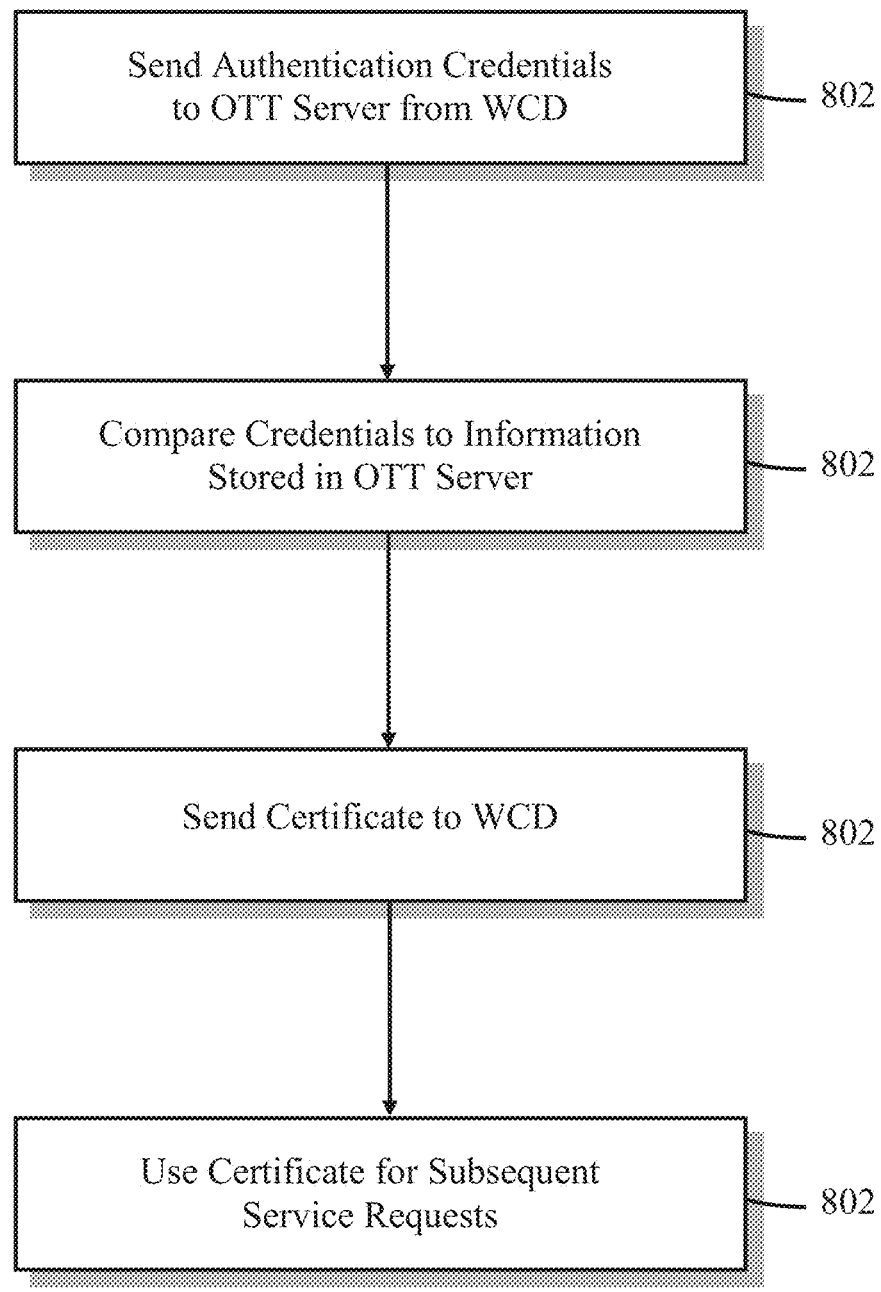
FIG. 8 is a flow diagram illustrating one embodiment of a method for authenticating a wireless communication device during a multi-plane communication with another wireless communication device.

FIG. 8 is a flow diagram illustrating one embodiment of a method 800 for authenticating WCD 102 during a multi-plane communication with WCD 104. The authentication process described in FIG. 8 separates service and network authentication. In prior art systems, network credentials are sometimes used to authenticate a user to a service, which is considered a reuse of the same credentials rather than a single authentication. It may be beneficial to independently authenticate to network providers, as this ensures that multiple connections may be established over various networks and carriers. This allows continuity at the OTT service level by ensuring authenticity without regard to a selected network carrier.

The method is implemented by a processor within WCD 102, such as processor 200 shown in FIG. 2, executing processor-executable instructions stored in a memory, such as memory 202 shown in FIG. 2. It should be understood that in some embodiments, not all of the steps shown in FIG. 8 are performed, and/or the order in which the steps are carried out may be different. It should be further understood that some minor method steps have been omitted for purposes of clarity.

At block 802, WCD 102 initiates a communication with WCD 104 by first authenticating WCD 102 to OTT server 124. Authentication is typically accomplished by WCD 102 sending authentication credentials to OTT server 124. The authentication credentials typically comprise a username and password, although any other single or combination of known credentials may be used in the alternative.

At block 804, the server receives the credentials sent by WCD 102 and compares the credentials to a set of locally-stored information pertaining to WCD 102 and/or the user operating WCD 102.

At block 806, if the authentication credentials provided by WCD 102 match the information stored by the server, the server may send an indication that authentication was successful, and allow WCD 102 access to the OTT service provided by the server. For example, the server may provide a signed certificate to WCD 102.

At block 808, the signed certificate may be used by WCD 102 in subsequent requests for service from the server.

Figure 9:
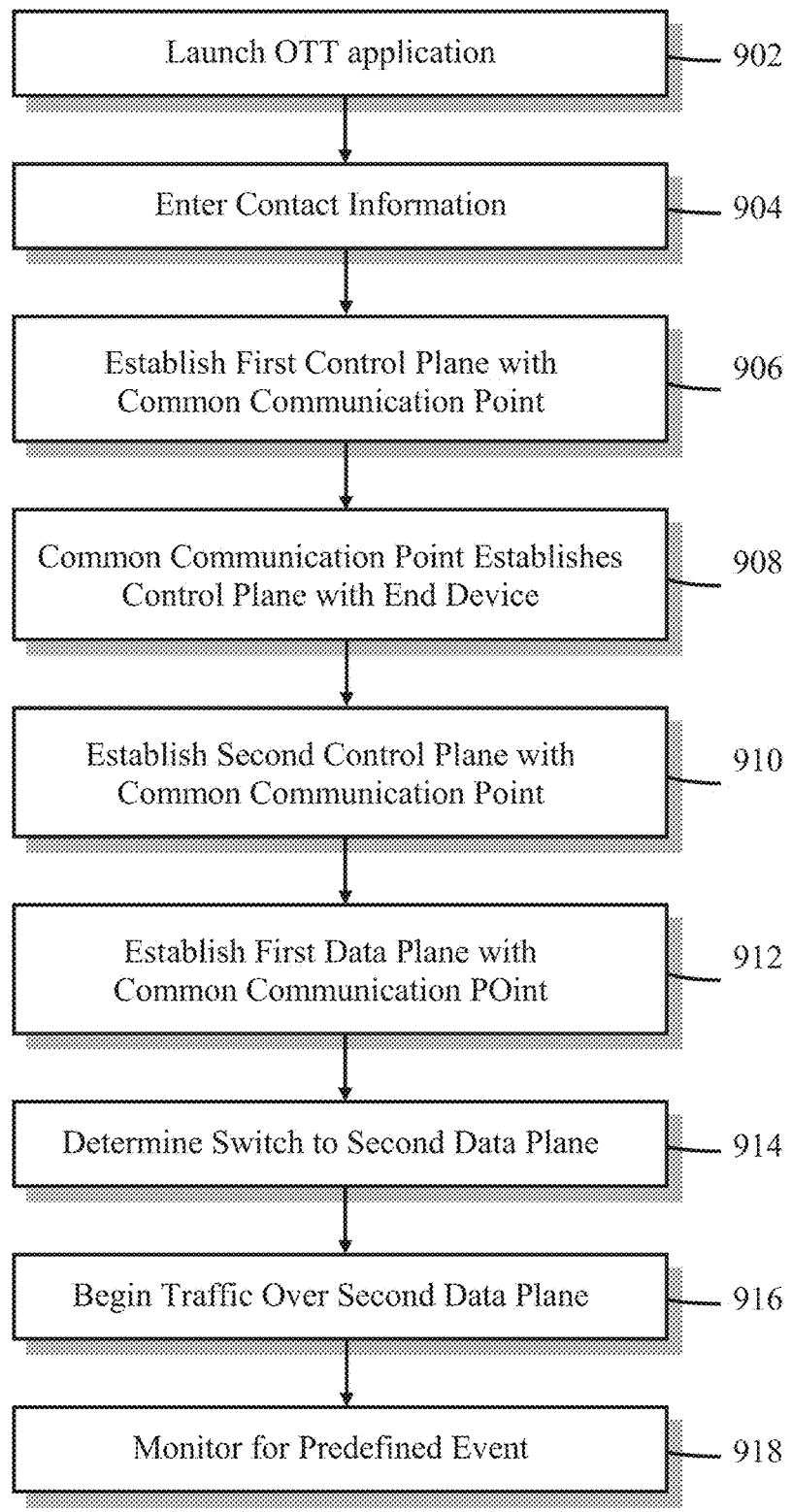
FIG. 9 is a flow diagram illustrating one embodiment of a method for maintaining communications between a wireless communication device using a client-based OTT application executed on the wireless communication device, and another communication device.

FIG. 9 is a flow diagram illustrating one embodiment of a method 900 for maintaining communications between a wireless communication device (e.g. WCD 102) using a client-based OTT application executed on the wireless communication device, and another communication device (e.g., fixed communication device 122). The method is implemented by a processor inside WCD 102, such as processor 200 shown in FIG. 2, executing processor-executable instructions stored in a memory, such as memory 202 shown in FIG. 2. It should be understood that the processor-executable instructions used to implement the method may be entirely associated with the OTT application running on WCD 102, with operations relating to core functionality of WCD 102, or shared between the two. In this embodiment, WCD 102 establishes control/data plane connections to a common communication point rather than with fixed communication device 122, as mentioned earlier. It should be further understood that in some embodiments, not all of the steps shown in FIG. 9 are performed, and/or the order in which the steps are carried out may be different. Finally, some minor method steps have been omitted for purposes of clarity.

At block 902, a user of WCD 102 launches a client-based OTT application resident on WCD 102, via user interface 204. In another embodiment, the OTT application is executed by default upon, for example, power-up of WCD 102.

At block 904, the user enters identifying information regarding a party that the user would like to contact via the OTT application (in this example, the party is a user of fixed communication device 122). The information may comprise a telephone number, an email address, or other information that uniquely identifies the party. The identifying information may have been previously entered and stored by the application, so that the user may simply select a party from, for example, an "address book" or "call history" stored by the application. Further still, the user may select the party via a "buddy list", "friends list", or similar, i.e., a list of contacts that the user has previously identified and stored in either the OTT application, at OTT server 124, or both.

At block 906, WCD 102, in response to the user selecting a party, establishes a first control plane connection with a common communication point, in this example, OTT server 124, over LAN 114, WAN 110, or cellular network 106 at particular frequency, data rate, band, QoS, or specified manner, i.e., "circuit switched voice" or "cellular data". In one embodiment, OTT server provides WCD 102 with an IP address associated with fixed communication device 122. Alternatively or in addition to providing the IP address of fixed communication device 122 to WCD 102, various network resources may be allocated between OTT server 124 and WCD 102 in order for user traffic to flow between the two. In one embodiment, establishment of the first control plane connection occurs after the user has selected a party to connect to or otherwise entered identifying information relating to the party.

In another embodiment, WCD 102 establishes and maintains control plane connections independently of the OTT application so that WCD 102 establishes control plane connections as they become available, and in accordance with predefined policies stored in memory 202, as discussed above. In this embodiment, the processor-executable instructions relating to establishment of control plane connections by WCD 102 may not be associated with any particular OTT application. However, any client-based OTT application may use the control plane connections and data plane connections established by these instructions during execution of an OTT application.

At block 908, OTT server 124 may establish a control plane connection with fixed communication device 122 in order to indicate that a communication from WCD 102 is available, and to manage the communication between WCD 102 and fixed communication device 122 during the communication.

At block 910, WCD 102 establishes a second control plane connection with either OTT server 124 or, in another embodiment, directly with fixed communication device 122. This may occur at any point after the establishment of the first control plane connection, or it may occur simultaneously with the establishment of the first control plane connection. The second control plane connection may utilize a different network than the first control plane connection, or both control plane connections could use the same network, but different frequencies, bands, data rates, protocols, etc. For example, a first control plane connection may comprise resources needed to establish a packet data connection WAN 110 using a Best Effort mode, while the second control plane connection comprises resources needed to establish a circuit-switched connection over cellular network 106.

In any case, WCD 102 establishes a second control plane connection with OTT server 124, or with fixed communication device 122, using the same or similar techniques discussed above with respect to establishing the first control plane connection. WCD 102 may establish more than two control plane connections in some embodiments, limited to the availability of networks, processing resources available within WCD 102, etc.

At block 912, at some point after establishment of the first control plane connection, a first data plane connection is established between WCD 102 and fixed communication device 122, the first data plane connection associated with the first control plane connection. However, user traffic may not flow through OTT server 124. Instead, the control plane connection established between WCD 102 and OTT server 124 only serves as a signaling connection between WCD 102 and fixed communication device 122, while the first data plane connection is independent of OTT server 124. In other embodiments, the first data plane connection is established with OTT server 124, and user traffic flows through OTT server 124. Establishment of the first data plane connection may occur before or after establishment of the second data plane connection. Establishing a data plane comprises sending user traffic, such as voice and/or video, between the devices. In the case where multiple control plane connections exist before the establishment of first data plane, a control plane connection is chosen based on one or more policies stored in memory 202 and may depend on factors such as potential/estimated call quality, cost, general network availability, data type, data rate, time of day, and/or other factors, as will be explained later herein.

At some point during the communication between WCD 102 and fixed communication device 122, it may become desirable for WCD 102 to switch the communication to a second data plane connection associated with the second control plane connection. The second data plane connection may or may not utilize OTT server 124. The switch may be desirable as a result of the deteriorating communication quality experienced by WCD 102 and/or as a result of other factors, such as the cost to route information through the first and/or second data planes, a time of day, the availability of a preferred network provider, etc. The decision of when to switch between data planes, and/or which data plane to use in an initial communication, may be determined by one or more policies, or rules, stored in memory 202, as described previously. Alternatively, in certain embodiments, the decision to switch from the first data plane to the second data plane may be made based on policies, data, or algorithms at the OTT Server 124. Some examples of these policies or algorithms could include determinations based on the cost, quality, or availability of the first and second data planes, respectively.

Thus, at block 914, WCD 102 determines one or more characteristics of the communication occurring between WCD 102 and fixed communication device 122 (or between WCD 102 and OTT server 124) and/or whether other factors, described above, are present. If one or more of the characteristics cross one or more predetermined thresholds, WCD 102 may terminate communications over the first data plane and begin communications using a second data plane associated with the second control plane that was previously established. The switch to the second data plane may comprise a break-before-make transition or a make-before-break transition. The pre-existence of the second control plane enables the traffic between WCD 102 and fixed communication device 122 (or OTT server 124) to occur quickly, with no or minimal perceived loss of call quality to either device.

In another embodiment, WCD 102, alternatively or in addition, monitors one or more characteristics of the second data plane while WCD 102 is sending and receiving traffic over the first data plane, as described previously.

At block 916, if at least one of the characteristics identified in one of the policies stored in memory 202 are met, WCD 102 may terminate user traffic over the first data plane and begin traffic flow over the second data plane by sending signaling information to fixed communication device 122 (or OTT server 124) via well-known signaling protocols such as SIP/SDP or SS7. The signaling information informs WCD 104 (or OTT server 124) that WCD 102 is changing the data plane connection, and to begin transmitting user traffic over the new data plane connection. In another embodiment, WCD 102 continues to receive traffic flow over the first data plane connection as it transitions to the second data plane connection. In one embodiment, communications may be transmitted and/or received over both data planes as the switch occurs. Thus, for a brief period of time (e.g., less than a second), communications between WCD 102 and fixed communication device 122 (or OTT server 124) may occur over both data planes.

At block 918, after switching to the second data plane, WCD 102 continues to monitor characteristics of one or both data planes and/or control planes, as well as other characteristics, in order to determine whether and when to switch either back to the first data plane, or to establish a third control plane connection for use in subsequent communications.

The above process may be repeated for the communications between server 104 and fixed communication device 122. In other words, first and second control plane connections may be established between server 104 and fixed communication device 122, and a first data plane connection established for transporting the user traffic from WCD 102, through server 104, and onto fixed communication device 122. Then, if fixed communication device 122 determines that the user traffic transported between fixed communication device 122 and server 104 should be switched to a second data plane due to user traffic quality and/or other conditions, fixed communication device 122 may provide signaling to server 104 to begin using a second data plane to send and receive user traffic, the second data plane established as a result of establishing the second control plane connection between fixed communication device 122 and server 104.

Figure 10:
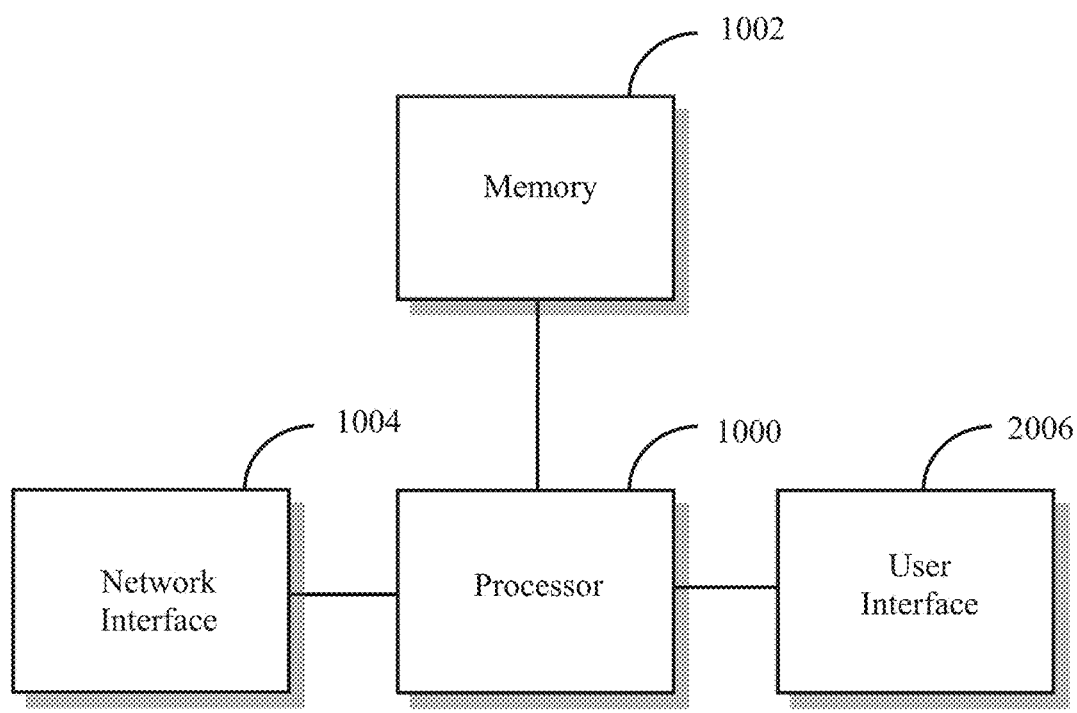
FIG. 10 illustrates a functional block diagram of one embodiment of a common communication point, such as an OTT server shown in FIG. 1 or other server associated with one of the WAN networks or cellular networks shown in FIG. 1.

FIG. 10 illustrates a functional block diagram of one embodiment of a common communication point, such as OTT server 124, or other server associated with WAN network (110, 112) or cellular network (106, 108). The common communication point typically comprises a processor 1000, a memory 1002, a network interface 1004, and an optional user interface 1006. The common communication point may comprise a computer, application server, web server, or other electronic device that enables communications to take place between end devices each operating a client-based, over-the-top (OTT) application. It should be understood that the functional blocks shown in FIG. 10 may be connected to one another in a variety of ways, and that certain, basic functionalities have been omitted (such as a power supply) for purposes of clarity.

Processor 1000 comprises a general-purpose microprocessor well known in the art or it may comprise a custom or semi-custom ASIC able to carry out the functionality required to support establishment of control plane connections and/or data plane connections. Processor 1000 generally executes processor-executable instructions stored in memory 1002, that control most or all of the functionality of the common communication point.

Memory 1002 comprises one or more information storage devices that can be accessed by processor 1000 and may include one or both of volatile and nonvolatile media, and/or removable and/or non-removable media, but excludes propagated signals. By way of example, and not limitation, such as volatile and/or nonvolatile, removable and/or non-removable media implemented in any method or technology for storage of information such as computer-readable instructions, data structures, program modules or other data. Memory 1002 includes, is not limited to RAM, ROM, EEPROM, flash memory, or other type of memory technology used in smartphone designs, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 1000.

Network interface 1004 comprises hardware and/or software configured to receive and process packet-based electronic communications from wireless communication device 102 and/or other communication devices over one or more communication networks, such as the Internet, fiber optic networks, radio networks, etc.

Processor-executable instructions are stored in memory 1002 that, when executed by processor 1000, allow the common communication point to receive requests from communication devices to establish multiple, simultaneous control plane connections with communication devices. Additionally, the instructions may allow the common communication point to establish one or more data plane connections that are associated with the control plane connections, with one or more of the communication devices. The instructions further enable the common communication point to begin sending and receiving user traffic over a second data plane connection upon a determination, by the wireless communication device, that at least one predetermined event has occurred, the second data plane connection related to the second control plane connection and for transporting the user traffic. The predetermined event may include a wireless communication device determining that one or more quality characteristics of a data plane connection has, or is about to, deteriorate past a predetermined level, and/or a characteristic relating to non-quality issues have occurred, such as a preferred network becoming available, or a less-expensive network has become available to a wireless communication device.

User interface 1006 generally comprises hardware and/or software necessary for allowing a user of the common communication point, such as an authorized technician or service provider, to perform various duties related to the maintenance and upkeep of the common communication point. User interface 1006 may comprise one or more commonly used input and/or output devices, such as a keyboard, mouse, touchscreen, a video display, and/or virtually any other device that allows a user of the common communication point to communicate with the common communication point.

The methods or algorithms described in connection with the embodiments disclosed herein may be embodied directly in hardware, in processor-executable instructions executed by a processor, or in a combination of the two. The processor-executable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or communication device. In the alternative, the processor and the storage medium may reside as discrete components.

Accordingly, various embodiments of the ideas presented herein may include a computer readable media embodying a code or processor-readable instructions to implement the methods of operation of the system in accordance with the methods, processes, algorithms, blocks and/or functions disclosed herein.

While the foregoing disclosure shows illustrative embodiments of the invention, it should be noted that various changes and modifications could be made herein without departing from the scope of the invention as defined by the appended claims. The functions, blocks and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A wireless communication device for executing a client-based, over-the-top (OTT) application, the client-based OTT application for maintaining communications with a second communication device, the wireless communication device comprising:
   a first transceiver for transmitting and receiving user traffic;
   a memory for storing processor-executable instructions; and
   a processor, coupled to the first transceiver, and the memory, for executing the processor-executable instructions that cause the wireless communication device to:
   establish a first control plane connection;
   contemporaneously establish a second control plane connection;
   establish a first data plane connection for transporting the user traffic, the first data plane connection relating to the first control plane connection;
   store a plurality of data points in the memory, each data point representing at least one quality characteristic of the first control plane connection in association with a location of the wireless communication device as the quality characteristic is measured;
   predict that a call quality of user traffic transported by the first data plane connection will cross a threshold quality level, wherein the predicting comprises comparing a current location of the wireless communication device to the plurality of data points to determine if the wireless communication device is progressing along a path corresponding to the locations of the wireless communication device stored in the memory, and wherein at least one predetermined event comprises at least one of the stored quality characteristics associated with a predicted future location of the wireless communication device exceeding the threshold quality level;
   establish a second data plane connection for transporting the user traffic if the at least one predetermined event has occurred, the second data plane connection related to the contemporaneously established second control plane connection; and
   transmit and receive the user traffic over the second data plane connection via the first transceiver.

2. The wireless communication device of claim 1, wherein the processor-executable instructions further cause the wireless communication device to:
   monitor the at least one characteristic of the user traffic received via the first data plane connection; and
   compare the at least one characteristic of the user traffic to the threshold quality level stored in a memory,
   wherein determining that at least one predetermined event has occurred comprises determining that the at least one characteristic of the user traffic has crossed the threshold quality level.

3. The wireless communication device of claim 2, wherein the at least one characteristic of the received user traffic comprises a quality of the user traffic, the threshold quality level comprises a minimum user traffic call quality, and the predetermined event comprises the quality of the user traffic is determined to be less than the minimum user traffic call quality.

4. The wireless communication device of claim 1, wherein the processor-executable instructions further cause the wireless communication device to:
   determine a cost of using the first data plane connection to transport the user traffic;
   determine a cost of using the second data plane connection to transport the user traffic;
   wherein determining that at least one predetermined event has occurred comprises determining that the cost of using the second data plane connection is less than the cost of using the first data plane connection.

5. The wireless communication device of claim 4, wherein the processor-instructions for determining the cost of using the first data plane connection comprises instructions that cause the device to:
   store first cost information associated with using the first data plane connection in a memory;
   store second cost information associated with using the second data plane connection in the memory; and compare the first cost information to the second cost information.

6. The wireless communication device of claim 1, wherein determining that at least one predetermined event has occurred comprises determining that the second control plane connection is associated with a preferred network provider.

7. The wireless communication device of claim 1, wherein the processor-executable instructions further cause the wireless communication device to:
  momentarily establish the second data plane connection while the user traffic is being transmitted and received via the first data plane connection;
  determine at least one characteristic of the second data plane connection; comparing the at least one characteristic of the second data plane connection to the threshold quality level stored in a memory;
  wherein determining that at least one predetermined event has occurred comprises determining that the at least one characteristic of the second data plane connection has crossed the threshold quality level.

8. The wireless communication device of claim 7, wherein the at least one characteristic of the second data plane connection comprises a quality of the second data plane connection, the threshold quality level comprises a minimum user traffic call quality, and the predetermined event comprises the quality of the second data plane connection determined to be less than the minimum user traffic call quality.

9. The wireless communication device of claim 7, wherein the processor-executable instructions for determining that at least one predetermined event has occurred comprises instructions that cause the processor to:
  determine that the at least one characteristic of the second data plane connection has crossed the threshold quality level and that the second data plane connection is associated with a preferred network provider.

10. The wireless communication device of claim 1, wherein the first control plane connection and the first data plane connection comprise a LAN network connection and the second control plane connection and the second data plane connection comprise a WAN network connection, wherein the processor-executable instructions further cause the wireless communication device to:
  after switching the user traffic to the second data plane connection, establish a third control plane connection comprising a second LAN network connection; and
  switch the user traffic to a third data plane connection associated with the third control plane connection as soon as the third data plane connection is available.

11. The wireless communication device of claim 1, wherein the processor-executable instructions that cause switching transmission and reception of the user traffic to the second data plane connection comprise instructions that cause the wireless communication device to:
  transmit a message from the wireless communication device to the second communication device to begin transmitting the user traffic via the second data plane connection;
  receive the user traffic from the second communication device over the second data plane connection in addition to continuing to receive the user traffic over the first data plane connection; and
  construct a user data stream from the user traffic received over both the first and second data plane connections.

12. The wireless communication device of claim 11, wherein the processor-executable instructions that cause constructing the user data stream comprise instructions that cause the wireless communication device to:
  determine that at least one data packet received over the first data plane connection has been received in error; and
  determine an identity of the data packet that was received in error;
  identify a data packet received over the second data plane connection with the same identity as the data packet that was received in error; and
  use the data packet received over the second data plane connection to construct the user data stream.

13. The wireless communication device of claim 1, wherein the processor-executable instructions further cause the wireless communication device to:
  re-establish the first data plane connection if communications between the wireless communication device and the second communication device are lost, comprising:
  re-establish the first control plane connection with the second communication device if communications were lost during communication over the first data plane connection; and
  re-establish the first data plane connection with the second communication device; or
  re-establish the second control plane connection with the second communication device if communications were lost during communication over the first data plane connection; and
  establish the second data plane connection with the second communication device.

14. The wireless communication device of claim 1, wherein the processor-executable instructions for establishing a first control plane connection by the wireless communication device comprise instructions that cause the wireless communication device to:
  establish a first control plane connection with a common communication point between the wireless communication device and the second communication device.

15. A wireless communication device for establishing and maintaining communications with a second communication device via a client-based, over-the-top (OTT) application running on both the wireless communication device and the second communication device, comprising:
  a first transceiver for transmitting and receiving user traffic, the user traffic comprising time-dependent information;
  a memory for storing processor-executable instructions; and
  a processor, coupled to the transceiver and the memory, for executing the processor-executable instructions that cause the wireless communication device to:
  establish a first control plane connection with the second communication device;
  establish a second control plane connection with the second communication device;
  establish a first data plane connection with the second communication device for transporting user traffic, the first data plane connection established as a result of establishing the first control plane connection;
  transmit and receive the user traffic via the first data plane connection;
  store a plurality of data points in the memory, each data point representing at least one quality characteristic of the first control plane connection in association with a location of the wireless communication device as the quality characteristic is measured;

predict that a call quality of user traffic transported by the first data plane connection will cross a threshold quality level, wherein the predicting comprises comparing a current location of the wireless communication device to the plurality of data points to determine if the wireless communication device is progressing along a path corresponding to the locations of the wireless communication device stored in the memory, and wherein at least one predetermined event comprises at least one of the stored quality characteristics associated with a predicted future location of the wireless communication device exceeding the threshold quality level;

determine to transmit and receive the user traffic over a second data plane connection if the at least one predetermined event has occurred, the second data plane connection established as a result of establishing the second control plane connection; and transmit and receive the user traffic over the second data plane connection.

* * * * *